United States Patent [19]
Tsushima et al.

[11] Patent Number: 6,044,450
[45] Date of Patent: Mar. 28, 2000

[54] PROCESSOR FOR VLIW INSTRUCTION

[75] Inventors: Yuji Tsushima, Kokubunji; Yoshikazu Tanaka, Tokorozawa; Yoshiko Tamaki, Kodaira; Masanao Ito, Kokubunji; Kentaro Shimada, Hadano; Yonetaro Totsuka, Kokubunji; Shigeo Nagashima, Hachioji, all of Japan

[73] Assignee: Hitachi, Ltd., Tokyo, Japan

[21] Appl. No.: 08/824,486

[22] Filed: Mar. 27, 1997

[30] Foreign Application Priority Data

Mar. 29, 1996 [JP] Japan .................................. 8-075513

[51] Int. Cl.$^7$ ...................................................... G06F 7/00
[52] U.S. Cl. ............................................. 712/24; 712/215
[58] Field of Search ...................................... 712/24, 215

[56] References Cited

U.S. PATENT DOCUMENTS

| | | | |
|---|---|---|---|
| 5,652,878 | 7/1997 | Craft | 395/691 |
| 5,699,536 | 12/1997 | Hopkins | 395/392 |
| 5,852,741 | 12/1998 | Jacobs | 395/800.24 |

FOREIGN PATENT DOCUMENTS 7105003  4/1995  Japan .

OTHER PUBLICATIONS

The Study Report of Information Processing Society of Japan, vol. 93–ARC–102, pp. 17–24.
The Study Reports of Information Processing Society of Japan, vol. 94–ARC–107, pp. 113–120.
The Papers of Parallel Processing Symposium JSPP '92, pp. 265–272.

*Primary Examiner*—Eric Coleman
*Attorney, Agent, or Firm*—Antonelli, Terry, Stout & Kraus, LLP

[57] ABSTRACT

Each small instruction in a VLIW instruction (long instruction) is added with the number of NOP instructions which succeed the small instruction, and these NOP instructions are deleted from the succeeding long instruction. A plurality of long instructions are therefore time-compressed. Thereafter, a plurality of small instructions in each long instruction are divided into a plurality of groups, and a combination of operation codes (OP codes) of small instructions in each group is replaced by a group code to generate a compressed, grouped instruction. Each long instruction is therefore space-compressed. An instruction expanding unit has an instruction expanding circuit for each grouped instruction. Each instruction expanding circuit expands one grouped instruction in a long instruction, generates a group of small instructions represented by the grouped instruction, and supplies the group of generated small instructions to respective function units via a decode unit. In this case, each instruction expanding circuit supplies after each small instruction NOP instructions same in number as that designated by a NOP number associated with each small instruction in this grouped instruction.

18 Claims, 15 Drawing Sheets

| | |
|---|---|
| (1) | LD FR26,Z(K+10) |
| (2) | LD FR1,T |
| (3) | LD FR2,R |
| (4) | LD FR3,Q |
| (5) LOOP: | MOVE FR4,FR26 |
| (6) | LDU FR5,Z(K+11) |
| (7) | FMUL FR6,FR5,FR1 |
| (8) | FMUL FR7,FR2,FR4 |
| (9) | FADD FR8,FR6,FR7 |
| (10) | LDU FR9,Y(K) |
| (11) | FMUL FR10,FR8,FR9 |
| (12) | FADD FR11,FR3,FR10 |
| (13) | STU FR11,X(K) |
| (14) | LDU FR12,Z(K+12) |
| (15) | FMUL FR13,FR2,FR5 |
| (16) | FMUL FR14,FR1,FR12 |
| (17) | FADD FR15,FR13,FR14 |
| (18) | LDU FR16,Y(K+1) |
| (19) | FMUL FR17,FR15,FR16 |
| (20) | FADD FR18,FR3,FR17 |
| (21) | STU FR18,X(K+1) |
| (22) | LDU FR19,Z(K+13) |
| (23) | FMUL FR20,FR2,FR12 |
| (24) | FMUL FR21,FR1,FR19 |
| (25) | FADD FR22,FR20,FR21 |
| (26) | LDU FR23,Y(K+2) |
| (27) | FMUL FR24,FR22,FR23 |
| (28) | FADD FR25,FR3,FR24 |
| (29) | STU FR25,X(K+2) |
| (30) | LDU FR26,Z(K+14) |
| (31) | FMUL FR27,FR2,FR19 |
| (32) | FMUL FR28,FR1,FR26 |
| (33) | FADD FR29,FR27,FR28 |
| (34) | LDU FR30,Y(K+3) |
| (35) | FMUL FR31,FR29,FR30 |
| (36) | FADD FR32,FR3,FR31 |
| (37) | STU FR32,X(K+3) |
| (38) | BR LOOP |

FIG.10

| 1 | 2 | 3 | 4 | 5 | 6 | 7 |
|---|---|---|---|---|---|---|
| LD/ST | | FLOATING POINT CALCULATION | | FIXED POINT CALCULATION | | BRANCH |
| LD FR26,Z(K+10) | LD FR1,T | NOP | NOP | NOP | NOP | NOP |
| NOP | LD FR3,Q | NOP | NOP | NOP | NOP | NOP |
| NOP | NOP | NOP | NOP | NOP | NOP | NOP |
| NOP | NOP | NOP | NOP | NOP | NOP | NOP |
| NOP | NOP | NOP | NOP | NOP | NOP | NOP |
| LDU FR5,Z(K+11) | LDU FR12,Z(K+12) | MOVE FR4,FR26 | NOP | NOP | NOP | NOP |
| LDU FR19,Z(K+13) | LDU FR26,Z(K+14) | NOP | NOP | NOP | NOP | NOP |
| NOP | NOP | FMUL FR7,FR2,FR4 | NOP | NOP | NOP | NOP |
| NOP | NOP | NOP | NOP | NOP | NOP | NOP |
| LDU FR9,Y(K) | LDU FR23,Y(K+2) | NOP | NOP | NOP | NOP | NOP |
| LDU FR16,Y(K+1) | LDU FR30,Y(K+3) | NOP | NOP | NOP | NOP | NOP |
| NOP | NOP | FMUL FR6,FR1,FR5 | FMUL FR13,FR2,FR5 | NOP | NOP | NOP |
| NOP | NOP | FMUL FR14,FR1,FR12 | FMUL FR20,FR2,FR12 | NOP | NOP | NOP |
| NOP | NOP | FMUL FR21,FR1,FR19 | FADD FR8,FR6,FR7 | NOP | NOP | NOP |
| NOP | NOP | FMUL FR27,FR2,FR19 | FADD FR15,FR13,FR14 | NOP | NOP | NOP |
| NOP | NOP | FMUL FR10,FR8,FR9 | FMUL FR28,FR1,FR26 | NOP | NOP | NOP |
| NOP | NOP | FMUL FR17,FR15,FR16 | FADD FR22,FR20,FR21 | NOP | NOP | NOP |
| NOP | NOP | FADD FR11,FR3,FR10 | FADD FR29,FR27,FR28 | NOP | NOP | NOP |
| NOP | NOP | FMUL FR24,FR22,FR23 | FADD FR18,FR3,FR17 | NOP | NOP | NOP |
| STU FR11,X(K) | NOP | NOP | FMUL FR31,FR29,FR30 | NOP | NOP | NOP |
| STU FR18,X(K+1) | NOP | FADD FR25,FR3,FR24 | NOP | NOP | NOP | NOP |
| NOP | STU FR25,X(K+2) | NOP | FADD FR32,FR3,FR31 | NOP | NOP | NOP |
| NOP | STU FR32,X(K+3) | NOP | NOP | NOP | NOP | BR LOOP |

FIG.11

| 1a | 2a | 3a | 4a | 5a | 6a | 7a |
|---|---|---|---|---|---|---|
| LD/ST | LD/ST | FLOATING POINT CALCULATION | FLOATING POINT CALCULATION | FIXED POINT CALCULATION | FIXED POINT CALCULATION | BRANCH |
| LD FR26,Z(K+10) (0) | LD FR1,T (0) | NOP | (4) | NOP(4) | NOP(4) | NOP (4) |
| LD FR2,R (4) | LD FR3,Q (0) | NOP | (0) | NOP(0) | NOP(0) | NOP (0) |
| LDU FR5,Z(K+11) (0) | LDU FR12,Z(K+12) (0) | MOVE FR4,FR26 | (1) | NOP(7) | NOP(7) | NOP (7) |
| LDU FR19,Z(K+13) (2) | LDU FR26,Z(K+14) (2) | FMUL FR7,FR2,FR4 | (3) | FMUL FR13,FR2,FR5 (0) | NOP(7) | NOP (7) |
| LDU FR9,Y(K) (0) | LDU FR23,Y(K+2) (0) | FMUL FR6,FR1,FR5 | (0) | FMUL FR20,FR2,FR12 (0) | NOP(5) | NOP (1) |
| LDU FR16,Y(K+1) (7) | LDU FR30,Y(K+3) (7) | FMUL FR14,FR1,FR12 | (0) | FADD FR8,FR6,FR7 (0) | NOP(0) | BR LOOP (0) |
| NOP (0) | NOP (0) | FMUL FR21,FR1,FR19 | (0) | FADD FR15,FR13,FR14 (0) | NOP(0) | NOP (0) |
| STU FR11,X(K) (0) | STU FR25,X(K+2) (0) | FMUL FR27,FR2,FR19 | (0) | FMUL FR28,FR1,FR26 (0) | NOP(0) | NOP (0) |
| STU FR18,X(K+1) (3) | STU FR32,X(K+3) (0) | FMUL FR10,FR8,FR9 | (0) | FADD FR22,FR20,FR21 (0) | NOP(0) | NOP (0) |
| NOP (0) | NOP (0) | FMUL FR17,FR15,FR16 | (0) | FADD FR29,FR27,FR28 (0) | NOP(0) | NOP (0) |
| NOP (0) | NOP (0) | FADD FR11,FR3,FR10 | (0) | FADD FR18,FR3,FR17 (0) | NOP(0) | NOP (0) |
| NOP (0) | NOP (0) | FMUL FR24,FR22,FR23 (1) | FMUL FR31,FR29,FR30 (1) | NOP(0) | NOP(0) | NOP (0) |
| NOP (0) | NOP (0) | FADD FR25,FR3,FR24 | (3) | FADD FR32,FR3,FR31 (2) | NOP(0) | NOP (0) |

FIG. 12A

| 0 | NOP | NOP | | | 30A |
|---|-----|-----|---|---|-----|
| 1 | LD  | LD  |   |   |     |
| 2 | LDU | LDU |   |   |     |
| 3 | STU | STU |   |   |     |

FIG. 12B

| 0  | NOP  | NOP  |      |      | 30B |
|----|------|------|------|------|-----|
| 1' | MOVE | NOP  |      |      |     |
| 2' | FMUL | FMUL |      |      |     |
| 3' | FADD | FADD |      |      |     |
| 4' | FMUL | FADD |      |      |     |

FIG. 12C

| 0 | NOP | NOP | 30C |
|---|-----|-----|-----|

FIG. 12D

| | LD/ST | | | | FLOATING POINT CALCULATION | | FIXED POINT CALCULATION | | BRANCH | |
|---|---|---|---|---|---|---|---|---|---|---|
| (1) | 1 | FR26,Z(K+10) | (0) | 0 | | (4) | (4) | FF | (4) | NOP | (4) |
| (2) | 1 | FR2,R | (4) | 0 | | (0) | (0) | FF | (0) | NOP | (0) |
| (3) | 2 | FR5,Z(K+11) | (0) | 1' | FR4,FR26 | (5) | (0) | FF | (7) | NOP | (7) |
| (4) | 2 | FR19,Z(K+13) | (2) | 2' | FR7,FR2,FR4 | (3) | FR13,FR2,FR5 | (0) | FF | (7) | NOP | (7) |
| (5) | 2 | FR12,Z(K+12) | (0) | 2' | FR6,FR1,FR5 | (0) | FR20,FR2,FR12 | (0) | FF | (5) | NOP | (7) |
| (6) | 2 | FR23,Y(K+2) | (0) | 3' | FR14,FR1,FR19 | (0) | FR8,FR6,FR7 | (0) | FF | (0) | NOP | (1) |
| (7) | 2 | FR30,Y(K+3) | (7) | 4' | FR21,FR1,FR12 | (0) | FR15,FR13,FR14 | (0) | FF | (0) | BR LOOP | (0) |
| (8) | 0 | | (3) | 2' | FR27,FR2,FR19 | (0) | FR28,FR1,FR26 | (0) | FF | (0) | NOP | (0) |
| (9) | 3 | FR25,X(K+2) | (0) | 4' | FR10,FR8,FR9 | (0) | FR22,FR20,FR21 | (0) | FF | (0) | NOP | (0) |
| (10) | 3 | FR32,X(K+3) | (3) | 4' | FR17,FR15,FR16 | (0) | FR29,FR27,FR28 | (0) | FF | (0) | NOP | (0) |
| (11) | 3 | FR11,X(K) | (0) | 3' | FR11,FR3,FR10 | (0) | FR18,FR3,FR17 | (0) | FF | (0) | NOP | (0) |
| (12) | 3 | FR18,X(K+1) | (3) | 2' | FR24,FR22,FR23 | (1) | FR31,FR29,FR30 | (1) | FF | (0) | NOP | (0) |
| (13) | FF | | (0) | 3' | FR25,FR3,FR24 | (3) | FR32,FR3,FR31 | (2) | FF | (0) | NOP | (0) |

PROCESSOR FOR VLIW INSTRUCTION

BACKGROUND OF THE INVENTION

1. Field of the Invention

The present invention relates to a processor for expanding and executing VLIW (very long instruction word) instructions (hereinafter also called a long instruction).

2. Description of the Related Art

The performance of a computer is determined by a period of one machine cycle and CPI (cycles per instruction) indicating the number of machine cycles required for executing one instruction. It is essential for improving the computer performance to shorten both the machine cycle period and CPI. There is a scheme of shortening CPI in which a number of instructions are executed during one machine cycle in parallel at the same time. One of typical examples of this scheme is a VLIW scheme (refer to David A. Patterson and John L. Hennessy, "Computer Architecture A quantitative approach" by Morgan Kaufmann Publishers, Inc., 1990).

In the VLIW scheme, a long instruction containing a plurality of instruction fields is used, and each instruction field controls a function unit such as a calculation unit and a memory unit. One instruction can therefore control a plurality of function units. In order to simplify an instruction issuing circuit, each instruction field of a VLIW instruction is assigned a particular operation or instruction (hereinafter called a small operation or instruction). A plurality of small instructions of one VLIW instruction can control at the same time a plurality type of function units assigned to the small instructions. Each small instruction is constituted of an operation code (hereinafter called an OP code) representative of the type of arithmetic operations and an operand representative of the subject of arithmetic operations. With the VLIW scheme, in compiling a VLIW instruction, the dependency relationship between small instructions of a program is taken into consideration to schedule the execution order of small instructions and distribute them into a plurality of VLIW instructions so as to make each VLIW instruction contain concurrently executable small programs as many as possible. As a result, a number of small instructions in each VLIW instruction can be executed in parallel and a computer executing such instructions does not require a complicated instruction issuing circuit. It is therefore easy to shorten the machine cycle period, to increase the number of instructions issued at the same time (hereinafter called an instruction parallel degree), and to reduce the number of cycles per instruction (CPI). This technique has drawn attention as a means of improving the performance of a computer.

In the VLIW scheme, each VLIW instruction contains instruction fields corresponding to function units. If there is a function unit not used by a VLIW instruction, the instruction field corresponding to this function unit is assigned a NOP (no operation) instruction indicating no operation. Depending on the kind of a program, a number of NOP instructions are embedded in a number of VLIW instructions. As NOP instructions are embedded in a number of instruction fields of VLIW instructions, the number of VLIW instructions constituting the program increases. Therefore, the main storage and instruction cache are consumed in storing a large capacity of these VLIW instructions.

Several proposals have been presented in order to reduce NOP instructions. For example, in the study reports of Information Processing Society of Japan, Vol. 93-ARC-102, pp. 17–24 (hereinafter called the first reference document), one or a plurality of consecutive invalid VLIW instructions each having only NOP instruction are removed. To this end, a field for storing the number of delay cycles of one or a plurality of invalid VLIW instructions is stored in the valid VLIW instruction to be executed immediately before one or a plurality of invalid VLIW instructions. After the preceding valid VLIW instruction, the succeeding valid VLIW instruction is executed after the lapse of the delay cycles. This technique can reduce the number of VLIW instructions so that it can be considered as a method of compressing VLIW instructions in time. This conventional technique also proposes a method of improving a use efficiency of function units by a multi-thread process which switches a series of invalid VLIW instructions having all fields filled with NOP instructions to another instruction series.

Another method of compressing VLIW instructions in time has been proposed in the study reports of Information Processing Society of Japan, Vol. 94-ARC-107, pp. 113–120 (hereinafter called the second reference document) or in the papers of "Parallel Processing Symposium JSPP '92", pp. 265–272 (hereinafter called the third reference document). In this technique disclosed, if a small instruction in each VLIW instruction is a NOP instruction, this NOP instruction itself is deleted. More specifically, each valid small instruction of a VLIW instruction is provided with a field for storing the number of NOP instructions (hereinafter also called a NOP number). The number of NOP instructions to be executed by the function unit assigned to a valid small instruction is stored in this field, and one or a plurality of NOP instructions contained in one or a plurality of consecutive VLIW instructions before the valid small instruction are deleted. Namely, after the valid small instructions contained in preceding VLIW instructions are executed by the function unit, the execution of the next valid small instruction is delayed by the number of cycles determined by the NOP number. With this method, preceding NOP instructions can be deleted for each instruction field. Therefore, the total numbers of NOP instructions and VLIW instructions can be reduced more than the first reference document. Furthermore, since only the number of deleted NOP instructions is stored in place of the NOP instructions themselves, the length of each VLIW instruction increases not so much. Therefore, the capacity of a program constituted such VLIW instructions can be reduced considerably as compared to the system not adopting this technique.

According to the technique disclosed in JP-A-7-105003 (hereinafter called the fourth reference document), a series of VLIW instructions containing other instructions in addition to NOP instructions is compressed and stored in a main storage or the like. The series of stored VLIW instruction is expanded and executed. Specifically, each of VLIW instructions in a program having different structures is replaced by a code sequence with a variable length, and each of VLIW instructions having the same structure is replaced by a predetermined code sequence. This compressed program made of a plurality of such code sequence is stored in a main storage. A plurality of non-compressed VLIW instructions corresponding to the plurality of code sequence of the compressed program are stored in an instruction decode memory provided separately from the main storage. In executing the compressed program, each non-compressed VLIW instruction of the corresponding code sequence of the compressed program is read from the instruction decode memory and executed. In order to determine the code sequence, the VLIW instruction having the same structure is required to have the same OP code and operand value in each small instruction. With this technique, each VLIW instruction is replaced by a code sequence having a shorter length so that this technique can be considered as a method of compressing VLIW instructions in space.

As compared with the conventional techniques described in the first to third reference documents, the conventional technique described in the fourth reference document is expected to generate a smaller program because a series of VLIW instructions containing other instructions in addition to NOP instructions is compressed. However, this technique described in the fourth reference document discriminates the structure of a VLIW instruction while considering even the operand field in the small instruction used for designating a register and the like. Therefore, the number of VLIW instructions in a program judged as having the same structure is not so large, and there is a possibility that the compression factor becomes not so large.

SUMMARY OF THE INVENTION

It is therefore an object of the present invention to provide a processor capable of executing a series of VLIW instructions compressed at a higher compression factor.

In order to achieve the above object, a compressed VLIW instruction used by a VLIW instruction processor of this invention has a plurality instruction fields corresponding to each of a plurality of function unit groups, and each instruction field includes a compressed, grouped instruction representative of a group of small instructions to be executed in parallel by each function unit corresponding to each instruction field, the compressed, grouped instruction being represented by an amount of information smaller than an amount of information of the group of small instructions.

The VLIW instruction processor of this invention includes a plurality of function units divided into a plurality of function unit groups. The processor includes an instruction expanding unit for expanding a VLIW instruction, the instruction expanding unit has a plurality of instruction expanding circuits operating in parallel and provided for each of the plurality of function unit groups.

Each instruction expanding circuit expands a compressed, grouped instruction in a long instruction supplied from an instruction supply unit, the compressed, grouped instruction contained in one instruction field corresponding to one function unit group corresponding to each instruction expanding circuit, generates a group of small instructions each to be executed by each function unit of the corresponding one function unit, and outputs in parallel the generated group of small instructions to the corresponding one function unit group.

More specifically, the compressed, grouped instruction includes a group code representative of a group of OP codes necessary for each of the group of small instructions represented by the grouped instruction, the compressed, grouped instruction being represented by an amount of information smaller than an amount of information of the group of OP codes, and a group of operand information sets representative of at least one operand necessary for one of the group of small instructions.

Each instruction expanding circuit has a group code expanding circuit and a small instruction generating unit. The group code expanding circuit expands a compressed group code in a long instruction supplied from the instruction supply unit, the compressed group code being contained in an instruction field corresponding to each instruction expanding circuit, generates a group of OP codes necessary for the group of small instructions represented by the group code, and outputs the group of generating OP codes in parallel. The small instruction generating unit generates a group of small instructions by combining each of the group of output OP codes with one of the group of operand information sets, and outputs in parallel the group of generated small instructions to the corresponding one function unit group corresponding to each instruction expanding circuit.

According to an embodiment of the processor of this invention, each instruction field of each compressed long instruction has a group of NOP numbers each corresponding to each of the group of small instructions represented by the compressed group code in the compressed, grouped instruction in each instruction field. Each NOP number represents the number of NOP instructions to be executed by one function unit which executed one small instruction corresponding to each NOP number.

The small instruction generating unit of each instruction expanding circuit has a group of small instruction generating circuits provided in correspondence with a plurality of function units in each function unit group corresponding to each instruction expanding circuit.

Each instruction generating circuit includes a small instruction selector circuit and a control circuit. The small instruction selector circuit generates one small instruction by combining one of the group of OP codes generated by the group code expanding circuit of each instruction expanding circuit, with respect to the compressed group code in one grouped instruction in one long instruction supplied from the long instruction supply circuit, with one of the group of operand information sets in the one grouped instruction, and supplies the generated one small instruction to one function unit corresponding to each small instruction generating circuit. After the one small instruction is supplied, NOP instructions same in number as that designated by one of the group of NOP numbers are sequentially supplied to the function unit corresponding to each small instruction generating circuit. The control circuit inhibits each small instruction generating circuit to supply a small instruction to the corresponding function unit, the small instruction being supplied from each instruction expanding circuit after the group of OP codes and containing one of a group of succeeding OP codes generated from a long instruction succeeding the one long instruction, until the NOP instructions same in number as that represented by the one NOP number are supplied completely.

BRIEF DESCRIPTION OF THE DRAWINGS

FIG. 8 is a diagram showing an example of a FORTRAN program illustrating the processes to be executed by the processor shown in FIG. 1.

FIG. 9 is a diagram showing an example of the FORTRAN program shown in FIG. 8 written by an assembly language for a virtual processor.

FIG. 10 is a diagram showing an example of a program obtained by scheduling the assembly language program shown in FIG. 9.

FIG. 11 is a diagram showing a program expressed by a series of long instructions having the format shown in FIG. 2A, the program executing the processes expressed by a series of instructions shown in FIG. 10.

FIG. 12A is a diagram showing an example of a load/store instruction table.

FIG. 12B is a diagram showing an example of a floating point calculation instruction table.

FIG. 12C is a diagram showing an example of a fixed point calculation instruction table.

FIG. 12D is a diagram showing an example of the program shown in FIG. 11 and expressed by a series of long instructions having the format shown in FIG. 2C.

DETAILED DESCRIPTION OF THE PREFERRED EMBODIMENTS

Figure 1:
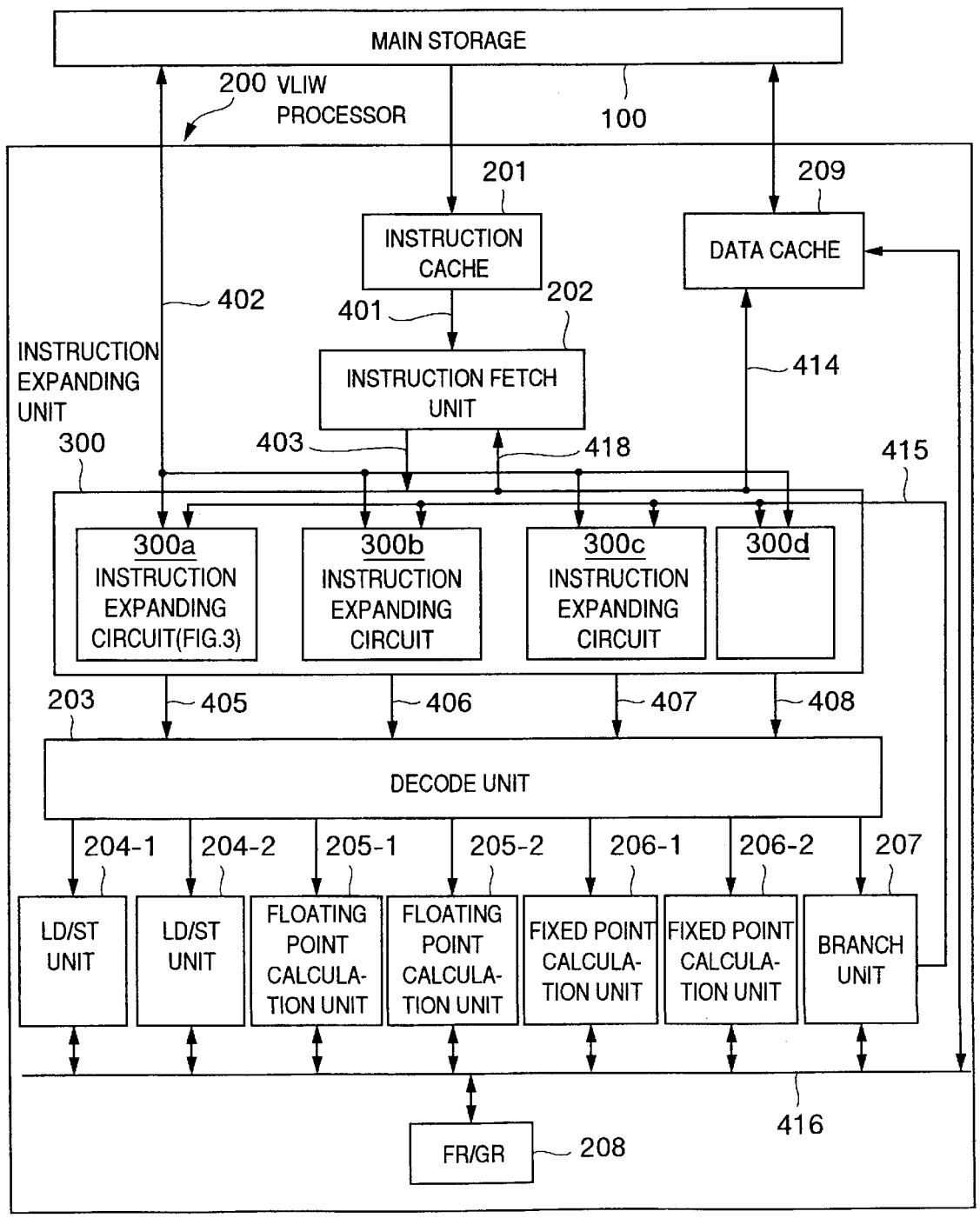
FIG. 1 is a schematic diagram showing the structure of a VLIW instruction processor according to an embodiment of the invention.

An embodiment of a VLIW instruction processor of this invention will be described in detail with reference to the accompanying drawings. In the following, identical or similar components are represented by using same reference numerals.

(1) Outline of structure

Referring to FIG. 1, a VLIW processor system has a main storage 100 and a VLIW processor 200 connected to the main storage. The processor 200 has a plurality of function units which execute in parallel a plurality of small instructions in one VLIW instruction. In this embodiment, the function units include: load/store (LD/ST) units 204-1 and 204-2 for executing a small instruction of load or store; floating point calculation units 205-1 and 205-2 for executing a small instruction of floating point calculation; fixed point calculation units 206-1 and 206-2 for executing a small instruction of fixed point calculation; and a branch unit 207 for executing a small instruction of branch. In the following description, a small instruction of load and a small instruction of store are also called simply a load instruction and a store instruction, and these small instructions are also called simply a load/store instruction or an L/S or LD/ST instruction. Similarly, a small instruction of floating point calculation is also called simply a floating point calculation instruction or an FL instruction. Similarly, a small instruction of fixed point calculation is also called simply a fixed point calculation instruction or an FX instruction. Similarly, a small instruction of branch is also called simply a branch instruction.

The main storage 100 stores therein programs constituted of a plurality of compressed VLIW instructions. An instruction fetch unit 202 sequentially fetches compressed VLIW instructions from an instruction cache 201 or from the main storage 100. An instruction expanding unit 300 expands each fetched, compressed VLIW instruction, and generates a non-compressed VLIW instruction composed of a plurality of small instructions. This instruction expanding unit is a circuit characteristic to this embodiment.

In this embodiment, a plurality of VLIW instructions are compressed in time to reduce the number of NOP instructions contained in these VLIW instructions. A VLIW instruction obtained in this manner is called a time-compressed VLIW instruction. Each time-compressed VLIW instruction is further compressed in space. For this space compression, a plurality of small instructions constituting each time-compressed VLIW instruction are divided into a plurality of groups, and a plurality of small instructions of each group are compressed to generate a new compressed, grouped instruction. In this manner, each time-compressed VLIW instruction is converted into a plurality of compressed, grouped instructions. A VLIW instruction after this conversion is also called a space-compressed VLIW instruction.

The instruction expanding unit 300 generates a non-compressed VLIW instruction by expanding each space-compressed VLIW instruction. There are provided a plurality of instruction expanding circuits 300a, 300b and 300c each generating a non-compressed VLIW instruction by expanding in time and space one of a plurality of compressed, grouped instructions constituting the space-compressed VLIW instruction. In this embodiment, the branch instruction is compressed in time but not in space. An instruction expanding circuit 300d is provided for time-expanding such a time-compressed branch instruction. Only in this point, the instruction expanding circuit 300d is different from the other instruction expanding circuits 300a, 330b and 300c. However, in the following description, these instruction expanding circuits 300a–300d will not be discriminated therebetween where appropriate.

A decode unit 203 analyzes each of a plurality of small instructions constituting the non-compressed VLIW instruction supplied from the instruction expanding unit 300 via one of signal lines 405–408, and supplies the analyzed small instruction to a corresponding one of the function units including the LD/ST units 204-1 and 204-2, floating point calculation units 205-1 and 205-2, fixed point calculation units 206-1 and 206-2, and branch unit 207. This decode circuit 203 is well known.

Each of the function units 204-1, 204-2, 205-1, 205-2, 206-1, 206-2, and 207 performs an operation designated by the small instruction supplied from the decode unit 203, by using a register group (hereinafter called a GR/FR register group) 208 and an internal bus 416. The GR/FR register group has a plurality of general registers (GR) and a plurality of floating point registers (FR). Of these function units, the LD/ST unit 204-1 or 204-2 loads or stores data by controlling the GR/FR register group 208 and a data cache 209 via the internal bus 416, when it receives a small instruction for requesting to load data stored in the main storage 100 or when it receives a small instruction for requesting to write data in the main storage 100. The floating point calculation unit 205-1 or 205-2 performs a register calculation by using the GR/FR register group 208 when it receives a floating point calculation small instruction. The fixed point calculation unit 206-1 or 206-2 performs a register calculation by using the GR/FR register group 208 when it receives a fixed point calculation small instruction. The branch unit 207 executes a branch operation designated by a branch instruction when it receives the branch instruction. If the branch has a different branch direction from a predicted one, a notice to the effect that the branch direction is different is supplied via a signal line 415 to a corresponding one of the instruction expanding circuits 300a–300d.

(2) Compression method of VLIW instruction

Figure 2A:
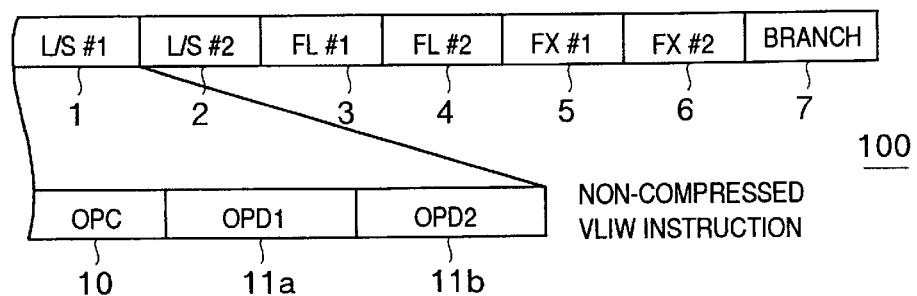
FIG. 2A is a diagram showing the format of a VLIW instruction not compressed.

FIG. 2A shows the format of a non-compressed VLIW instruction 100 used by the embodiment. This instruction has seven instruction fields 1, 2, . . . , 6 and 7 for setting small instructions each being executed by one of the seven function units shown in FIG. 1. A small instruction set to each instruction field is a valid instruction or a NOP instruction. In this embodiment, these instruction fields 1–7 are assigned with seven small instructions to be executed by the LD/ST units 204-1 and 204-2, floating point calculation units 205-1 and 205-2, fixed point calculation units 206-1 and 206-2, and branch unit 207. Each valid small instruction has a sub-field 10 for setting an OP code (OPC) representative of the kind of operation and sub-fields 11a and 11b for setting operands OPD1 and OPD2 used for the operation indicated by the small instruction.

Figure 2B:
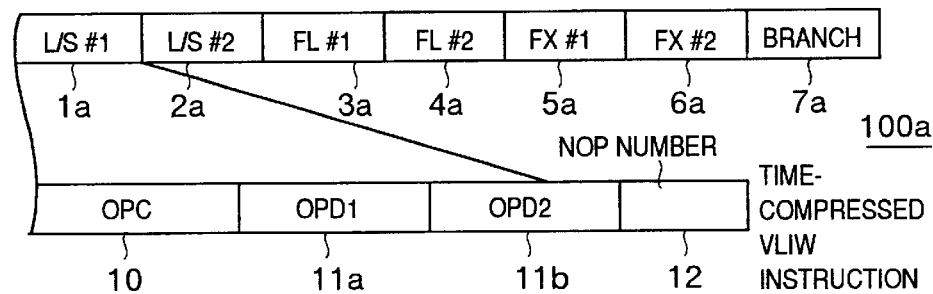
FIG. 2B is a diagram showing the format of a VLIW instruction compressed in time.

FIG. 2B shows the format of a VLIW instruction 100a obtained when a plurality of VLIW instructions having the format of FIG. 2A are compressed in time. A valid small instruction or a NOP instruction is set to each of instruction fields 1a, 2a, . . . , 6a and 7a of this VLIW instruction. Each small instruction has an additional NOP number sub-field 12 which is not provided in the VLIW instruction shown in FIG. 2A. This NOP number sub-field is provided even if the small instruction is a NOP instruction. The NOP sub-field 12 of each small instruction is set with the number of NOP instructions which are to be used, after the execution of this small instruction and before the execution of a next valid small instruction contained in the same instruction field of the succeeding VLIW instruction. Namely, the number of NOP instructions corresponds to the number of execution delay cycles of the next valid small instruction.

Specifically, if there are NOP instructions in the same instruction fields of the succeeding non-compressed VLIW instructions, the number of NOP instructions is stored in the NOP number sub-field of the valid small instruction in the VLIW instruction immediately before the VLIW instructions containing NOP instructions. In other words, in place of a plurality of NOP instructions contained in different VLIW instructions, one NOP number is set and the NOP instructions are deleted from the VLIW instructions. By using the NOP number, small instructions in the instruction fields of consecutive VLIW instructions are packed and the number of VLIW instructions can be reduced. In this embodiment, therefore, this process is called time compression.

Figure 2C:
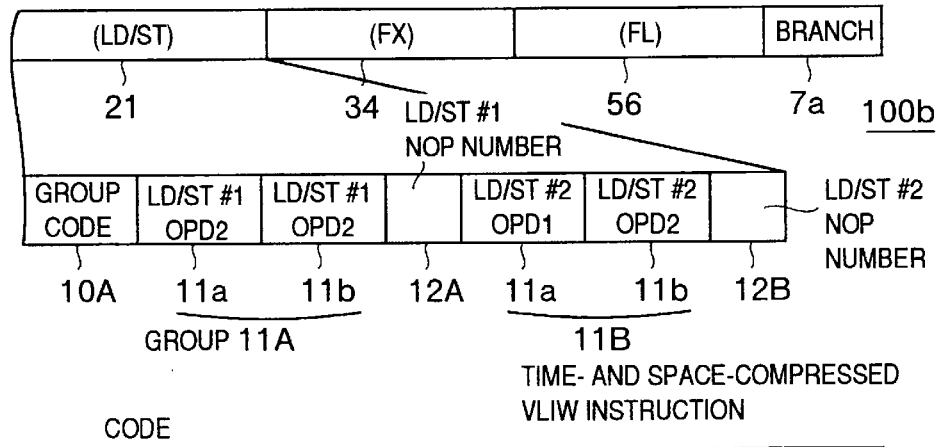
FIG. 2C is a diagram showing the format of a VLIW instruction compressed both in time and space.

FIG. 2C shows the format of a VLIW instruction 100b obtained by compressing in space one time-compressed VLIW instruction having the format shown in FIG. 2B. A grouped instruction is set to each of instruction fields 21, 34, 56 and 7a of this VLIW instruction 100b. For this space compression, a plurality of small instructions in one time-compressed VLIW instruction is divided into a plurality of groups each constituted of a plurality of small instructions, and a plurality of small instructions contained in each group are compressed to generate a grouped instruction representative of a group of small instructions. Specifically, in place of OP codes of each group, a group code is set which unanimously determines a combination of the OP codes. This group code has a length shorter than the total length of the OP codes. Therefore, this group code is a compressed code of the OP codes of small instructions. The operand information of these small instructions is set in the grouped instruction.

In this manner, a grouped instruction for a group of small instructions is generated, the grouped instruction including one compressed group code and a plurality of information sets of the small instructions. In addition, the length of the NOP number sub-field of each of a plurality of small instructions of the grouped instruction is shortened properly. Therefore, the length of a VLIW instruction having a plurality of these grouped instructions becomes shorter than the VLIW instruction compressed only in time and not in space. This newly generated VLIW instruction is also called a space-compressed VLIW instruction where applicable.

In this embodiment, for example, the two small instructions in the load/store instruction fields 1a and 2a shown in FIG. 2B are compressed to generate a new grouped instruction (FIG. 2C). For example, the field 21 of the grouped instruction shown in FIG. 2C includes: a sub-field 10A for setting a group code obtained by compressing the OP codes of the small instructions 1a and 2a; an operand sub-field 11A for setting the operands 11a and 11b of the small instruction 1a; a sub-field 12A for setting the NOP number of the small instruction 1a; an operand sub-field 11B for setting the operands 11a and 11b of the small instruction 2a; and a sub-field 12B for setting the NOP number of the small instruction 2a.

The field 21 shown in FIG. 2C is set with a grouped instruction generated in the above manner. Similarly, two small instructions in the floating point calculation instruction fields 3a and 4a are compressed in space to generate a new grouped instruction. A field 34 shown in FIG. 2C is set with a grouped instruction generated in this manner. Similarly, two small instructions in the fixed point calculation instruction fields 5a and 6a are compressed in space to generate a new grouped instruction. A field 56 shown in FIG. 2C is set with a grouped instruction generated in this manner.

In this embodiment, as will be later detailed, at least one instruction table is used. This instruction table stores a plurality combination of OP codes of two small instructions and a compressed group code representative of each combination. The group code is used as a pointer to the location, in the instruction table, of each OP code combination of two small instructions. This group code is used to refer to the instruction table when two small instructions of the time-compressed VLIW instruction are compressed in space. The group code is set to the sub-field 10a of each of the fields 21, 34 and 56.

In this embodiment, in the space-compressed VLIW 100b shown in FIG. 2C, the branch instruction 7a has no other small instructions to be compressed in space. Therefore, the branch instruction 7b is not compressed in space, but the branch instruction 7b itself shown in FIG. 2B is set to the space-compressed VLIW instruction 100b shown in FIG. 2C.

In this embodiment, a first program written by non-compressed VLIW instructions shown in FIG. 2A is generated from a source program. A second program written by the time-compressed VLIW instructions shown in FIG. 2B is generated by time-compressing the first program. A third program written by the space-compressed VLIW instructions shown in FIG. 2C is generated by space-compressing the second program. This third program is used as a program to be executed. The compression sequence will be described by using a particular program.

Figure 8:
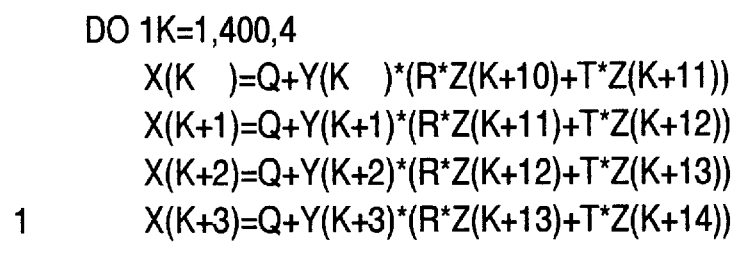

FIG. 8 shows a benchmark program which is obtained by expanding a famous Rivermore kernel—kernel loop No. 1 by a fourfold. It is assumed that a program shown in FIG. 9 is obtained by coding this benchmark program by the assembler language of the processor structured as shown in FIG. 1. A number enclosed between parenthesis at the left side of FIG. 9 is a serial number of each instruction of the program.

In this program shown in FIG. 9, LD of the first to fourth instructions represents a load instruction. With this load instruction, data in the main storage at an address (an address designated by a (K+10)th element of an array Z or by a variable T, R or Q) designated by the second operand of this instruction is loaded into a register (the 26th, 1st, 2nd or 3rd floating point register FR26, FR1, FR2 or FR3) designated by the first operand.

MOVE of the fifth instruction is a data move instruction. With this data move instruction, the contents of the register (the 26th floating point register FR26) represented by the second operand are copied to the register (the 4th floating point register (FR4)) represented by the first operand.

FMUL of the 7th, 11th, 15th, 16th, 19th, 23rd, 27th, 31st, 32nd and 35th instructions is a floating point multiplication instruction. With this instruction, a product of the contents of the two floating point registers designated by the second and third operands is stored in the floating point register designated by the first operand.

FADD of the 12th, 20th, 28th and 36th is a floating point addition instruction. With this instruction, an addition of the contents of the two floating point registers designated by the second and third operands is stored in the floating point register designated by the first operand.

LDU of the 10th, 14th, 18th, 22nd, 26th, 30th and 34th is a load up instruction. With this instruction, similar to the load instruction, data in the main storage at the address designated by the second operand is loaded in the register designated by the first operand, and different from the load instruction, after the data is loaded, the value of a register (not shown) holding the address of the second operand is incremented by a designated amount of addresses.

With the 38th branch instruction, the operation is branched to the instruction (fifth instruction) affixed with a label LOOP as many repetition times as set in the 0th general register (in the case of this embodiment). In FIG. 10, an instruction to preset the repetition times to the general register is omitted. The program shown in FIG. 9 executes the first to fourth instructions and thereafter repetitively executes the instructions from the fifth instruction affixed with the label LOOP to the last branch instruction.

A series of instructions shown in FIG. 9 is scheduled properly to obtain a series of instructions shown in FIG. 10. This scheduling is performed so that the processes of the series of instructions (1) to (38) shown in FIG. 9 are executed by the processor shown in FIG. 1 as a series of non-compressed VLIW instructions having the format shown in FIG. 2A and that the time required for the execution completion of the instructions is shortened. It is assumed that the number of machine cycles (load latency) is "6" which is required for the data to become usable after the processor shown in FIG. 1 executes the load instruction and that the number of machine cycles (latency) is "2" which is required for the calculation results to become usable after a calculation instruction such as a multiplication instruction and an addition instruction is executed.

In FIG. 10, each row indicates one non-compressed VLIW instruction. The VLIW instruction at an upper posi-tion is executed earlier. Information contained in each small instruction is in conformity with the format shown in FIG. 2A. In the instruction series shown in FIG. 9, no fixed point calculation is contained so that all fields of the two fixed point columns of VLIW instructions shown in FIG. 10 are filled with NOP instructions.

The VLIW instructions executing the processes requested by the first to fourth instructions in the area above the double line in FIG. 9 are executed only once. The VLIW instruction series in the area below the double line executing the processes requested by the fifth and following instructions are executed repetitively. This discrimination by the double line is also applied to FIGS. 11 and 13. As seen from FIG. 10, he first to fourth instructions shown in FIG. 9 are executed by the first to sixth VLIW instructions shown in FIG. 10, whereas the fifth and following instructions shown in FIG. 9 are executed by the seventh and following VLIW instructions shown in FIG. 10.

FIG. 11 shows a series of VLIW instructions obtained by time-compressing the VLIW instructions shown in FIG. 10. Each of the VLIW instructions shown in FIG. 11 has the format shown in FIG. 2B. A NOP number sub-field is added to each small instruction in each VLIW instruction shown in FIG. 10. The number of NOP instructions after each small instruction is set to this NOP number sub-field, and the succeeding NOP instructions are deleted to thereby obtain the VLIW instruction shown in FIG. 11. This NOP number sub-field is represented in FIG. 11 by parenthesis and a number between them. For example, the third to sixth NOP instructions in the left two columns of FIG. 10 are deleted, and the number "4" of deleted NOP instructions is set to the NOP number sub-fields of the two second load instructions in FIG. 11.

In this embodiment, the NOP number sub-field is assumed as having a 3-bit length. Therefore, the number of succeeding NOP instructions, only "0" to "7", can be set to one NOP number sub-field, and all these succeeding NOP instructions can be deleted. If the number of succeeding NOP instructions is "8" or larger, a value "7" is set to the NOP number sub-field of this small instruction, and seven NOP instructions among the succeeding NOP instructions are deleted. The remaining NOP instructions not deleted are set, at a maximum of "7", to the NOP number sub-field of the next VLIW instruction. If the remaining NOP instructions is in excess of "7", the similar process as above is repeated.

Even if the number of succeeding NOP instructions is "7" or smaller, all NOP instructions are not deleted in some cases. For example, the small instructions in the first to sixth VLIW instructions for the first floating point calculation are all NOP instructions and the total number of NOP instructions is "6". The small instructions in the first to sixth VLIW instructions for the second floating point calculation are also all NOP instructions and the total number is Although the total number of these NOP instructions is smaller than "7", the first to sixth NOP instructions for the floating point calculation shown in FIG. 10 are distributed into two VLIW instructions as shown in FIG. 11 because the first and second VLIW instructions of FIG. 11 are essential for executing the processes requested by the two VLIW instructions as stated earlier. In this example, the first NOP number field is set to "4" among the six NOP instructions of the first to sixth VLIW instructions for the first floating point calculation shown in FIG. 10. In this example, "4" is set to the NOP number sub-field of the first VLIW instruction and "0" is set to the NOP number sub-field of the second VLIW instruction. This setting depends on an algorithm adopted in this embodiment. If another algorithm is adopted, for example, "2" may be set for each of the first and second VLIW instructions.

As above, even if the total number of consecutive NOP instructions in the same fields of different VLIW instructions is smaller than "7", the NOP instructions are not deleted more than the total number of time-compressed VLIW instructions necessary for the execution of the processes required by the valid small instructions in the time-compressed VLIW instructions containing such NOP instructions.

Each of the time-compressed VLIW instruction shown in FIG. 11 is space-compressed to obtain a series of instructions shown in FIG. 12. For this space compression, a plurality of small instructions constituting each VLIW instruction shown in FIG. 11 are divided into a plurality of groups, and a plurality of small instructions of each group is space-compressed to thereby space-compress the time-compressed VLIW instruction. In this embodiment, each time-compressed VLIW instruction is divided into small grouped instructions each composed of two small instructions, including a pair of L/S instructions, a pair of FL instructions, and a pair of FX instructions, and into one small grouped instruction composed of the branch instruction. In addition, an instruction table is prepared which stores a plurality combination of OP codes the small instructions of each group can take, and a compressed group code representative of each combination is used. The group code is used as a pointer to the location, in the instruction table, of each OP code combination of two small instructions.

FIGS. 12A, 12B and 12C show instruction tables 30A, 30B and 30C corresponding to the L/S instruction group, FL instruction group and FX instruction group. This instruction table, for example, the instruction table 30A for the L/S instruction group, is formed by deriving different combinations of OP codes contained in the two time-compressed L/S instruction columns. The instruction tables for the FL instruction group and FX instruction group are formed in the same manner as above. As seen from FIGS. 12A, 12B and 12C, the instruction table 30A for the L/S instruction group is composed of only four entries, the instruction table 30B for the FL instruction group is composed of five entries, and the instruction table 30C for the FX instruction group is composed of one entry of a combination of NOP and NOP. In this embodiment, a row number written at the side of each instruction table is used as the group code which stands for the combination of OP codes at each row.

FIG. 12 shows the space-compressed VLIW instructions generated from the VLIW instructions shown in FIG. 11 by using the group codes. The group code 10A for each grouped instruction is written at the leftmost column of each L/S instruction group. The group code for the FL instruction group is written in the same manner. The seventh L/S instruction group is constituted of NOP instructions. The reason why the time-compressed VLIW instructions contain NOP instructions is the same as described with the time-compressed VLIW instructions shown in FIG. 11. The group code for the tenth and following L/S instruction group is "FF". A small instruction having this code is an invalid instruction which is not executed although it is fetched. In the following, such a small instruction is called an invalid instruction or simply an FF instruction. The NOP instruction is executed in one machine cycle. Therefore, the invalid instruction is different from the NOP instruction in that the former is not executed.

The reason why such an invalid instruction is used is as follows. If a usage difference between function units (instruction fields) occurs because of time compression, one function unit is assigned a valid small instruction whereas another function unit is not assigned a valid small instruction. In the VLIW computer, small instructions for all function units are fetched collectively so that it is not possible to fetch only valid small instructions in one VLIW instruction. It is therefore necessary to assign a function unit having no valid small instruction with an invalid small instruction. If the NOP instruction is used for this assigned invalid small instruction, the execution among function units shifts, particularly in the case of repetitive processes, because the NOP instruction requires one cycle execution time. From this reason, not the NOP instruction but the invalid instruction is used. The invalid instruction is inserted as in the following. Compiled program codes are divided at a branch destination of the branch instruction, i.e., at the labeled location, and time compression is conducted for each collection of divided codes (this collection is called hereinafter a block). If there is a usage difference between function units used in each block, invalid instructions are added to the end of an instruction field so that the number of instructions becomes the same as the other instruction field having the largest valid instructions.

In FIG. 12D, the group codes for all FX small instruction groups are FF because the invalid instructions are inserted, assuming in this embodiment that the effective small instructions are not used. To the branch instruction field shown in FIG. 12D, the branch instruction itself contained in the time-compressed VLIW instruction is set. Namely, this branch instruction is not compressed in space although it is compressed in time.

In this embodiment, therefore, the time-compressed VLIW instruction series shown in FIG. 12D and a plurality of instruction tables 30A–30C shown in FIGS. 12A–12C are used for executing the program shown in FIG. 9 or 10. Prior to executing this program, the instruction tables 30A–30C are read from the main storage 100 and supplied to the instruction expanding circuits 300a, 300b, and 300c which then expand the grouped instructions. To this end, an instruction for loading the instruction tables is executed. This instruction will be later described.

(3) Expansion of VLIW instructions.

The VLIW instruction series 40 and the instruction tables 30A–30C are stored in the main storage 100. Referring to FIG. 1, the instruction fetch unit 202 sequentially fetches the space-compressed VLIW instruction series 40 (FIG. 12D) from the instruction cache 201 or the main storage 100. The instruction expanding unit 300 expands the fetched instructions by using the instruction tables 30A–30C, and supplies the expanded instructions to the decode unit 203. In this embodiment, the instruction tables 30A–30C are loaded in advance from the main storage 100 by the instruction expanding unit 300 by using the method to be described later.

The instruction expanding unit 300 expands each of a plurality of grouped instructions contained in each time- and space-compressed VLIW instruction into a plurality of small instructions not compressed both in time and space. The instruction expanding unit 300 has a plurality of instruction expanding circuits for expanding each of a plurality of grouped instructions contained in each time- and space-compressed VLIW instruction. In this embodiment, there are provided an instruction expanding circuit 300a for LD/ST instructions, an instruction expanding circuit 300b for floating point instructions (FL instructions), an instruction expanding circuit 300c for fixed point instructions (FX instructions), and an instruction expanding circuit 300c for the branch instruction. Of these instruction expanding circuits, the instruction expanding circuits 300a–300c expand an instruction compressed both in time nor space, whereas the instruction expanding circuit 300d expands the branch instruction not compressed in space but compressed in time. The instruction expanding circuits 300a–300c have the same structure with respect to the expansion of an instruction compressed both in time and space. Since the instruction expanding circuit 300d expands the branch instruction not compressed in space but compressed in time, it has the structure more simple than those of the instruction expanding circuits 300a–300c. The instruction fetch unit 202 has a circuit (not shown) for distributing in parallel a plurality of grouped instructions in a fetched instruction compressed both in time and space to the instruction expanding circuits 300a–300d via a line 403. In this embodiment, the branch instruction is fetched in accordance with branch prediction. A circuit for such prediction, a circuit for activating to fetch a branch destination instruction based on the prediction, and other circuits are not shown and omitted for simplicity purpose.

Figure 3:
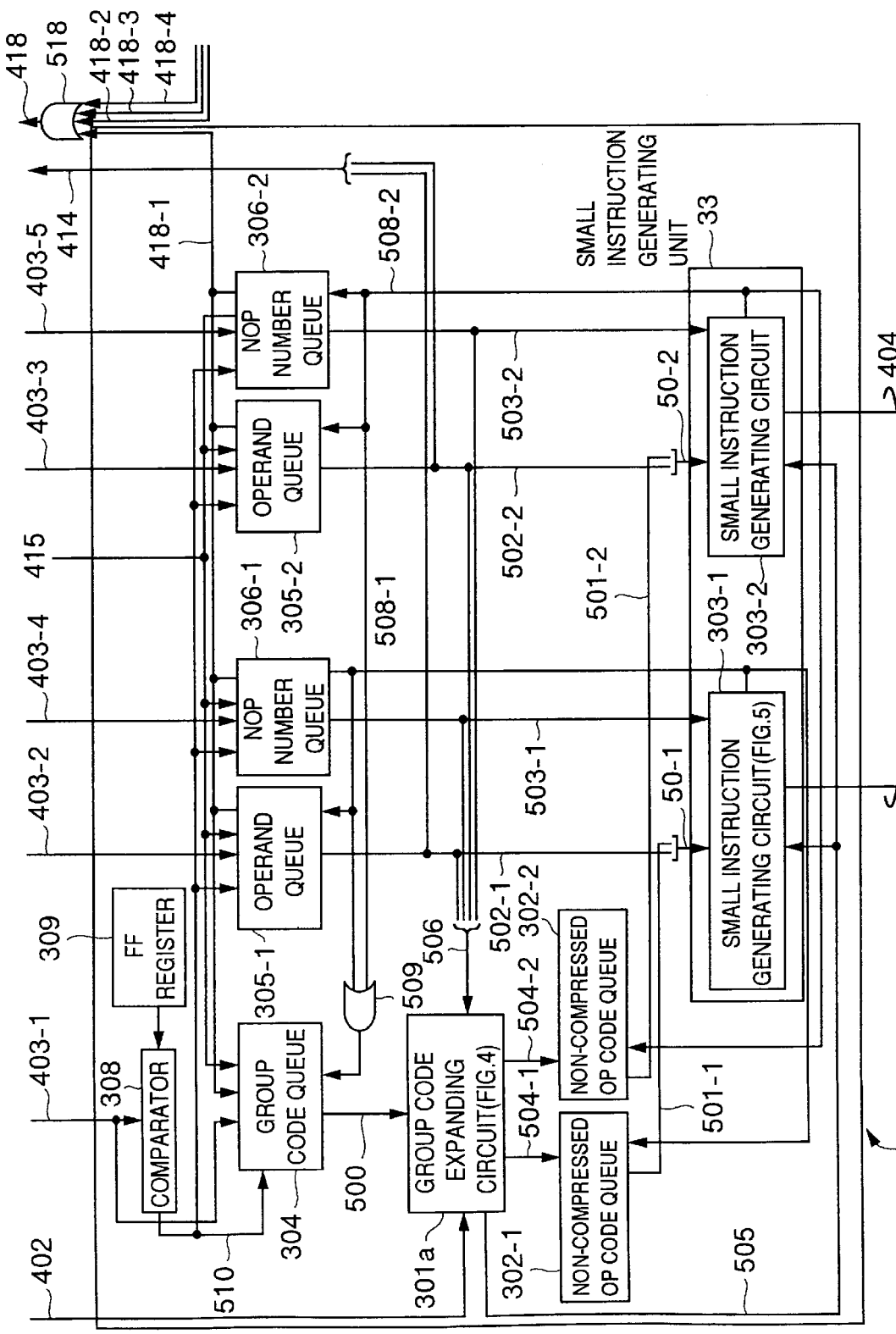
FIG. 3 is a circuit diagram briefly showing an instruction expanding circuit to be used by the processor shown in FIG. 1.

FIG. 3 shows an example of the instruction expanding circuit 300a of the processor shown in FIG. 1. Referring to FIG. 3, the instruction expanding circuit 300a has a plurality of queues each for storing a corresponding one of a plurality of sub-fields of a compressed, grouped instruction supplied via the line 403 from the instruction fetch unit 202. More particularly, a group code queue 304 receives the group code contained in the sub-field 10a of the compressed, grouped instruction via a line 403-1, and an operand queue 305-1 receives a plurality of operands OPD1 and OPD2 contained in the sub-field 11A of the compressed, grouped instruction via a line 403-2. A NOP number queue 306-1 receives a NOP number contained in the sub-field 12A of the compressed, grouped instruction via a line 403-4, and an operand queue 305-2 receives a plurality of operands OPD1 and OPD2 contained in the sub-field 11B of the compressed, grouped instruction via a line 403-3. 2. A NOP number queue 306-2 receives a NOP number contained in the sub-field 12B of the compressed instruction via a line 403-5. These queues are first-in first-out queues which first output first received information. A comparator 308 and an FF register 309 are used for inhibiting the group code queue 304 or the like to receive information contained in small instructions of a grouped instruction supplied from the instruction fetch unit 202 if this grouped instruction is the invalid instruction (FF instruction).

The instruction expanding circuit 300a has a group code expanding loping circuit 301 which expands the group code output from the group code queue 304 into a corresponding combination of OP codes. The instruction expanding circuit 300a has non-compressed OP code queues 302-1 and 302-2 for storing a combination of non-compressed OP codes read from the group code expanding circuit 301, and has a small instruction generating unit 33 for generating a plurality of small instructions in accordance with a plurality of OP codes output from the OP code queues 302-1 and 302-2 and outputting them to a plurality of function units corresponding to the instruction expanding circuit 300a. This small instruction generating unit 33 has instruction generating circuits 303-1 and 303-2 provided in correspondence with the OP code queues 302-1 and 302-2. The small instruction generating circuit 303-1 either outputs a small instruction at a line 501 composed of the OP code output from the OP code queue 303-a and the operand output from the operand queue 305-1, or a NOP instruction to the corresponding function unit, in accordance with the NOP number supplied from the NOP number queue 306-1. After a small instruction on the line 50-1 is selected, it outputs NOP instructions during the period of cycles equal to the NOP number contained in the small instruction. In this manner, NOP instructions are generated as many as the NOP number contained in the small instruction. In this manner, the small instruction generating circuit time-expands the small instruction obtained through space expansion by the group code expanding circuit, to thereby generate a plurality of small instructions compressed neither in time nor in space. The other small instruction generating circuit 303-2 operates in the similar manner as above, in cooperation with the OP code queue 302-2, operand queue 305-2, and NOP number queue 306-2.

Figure 4:
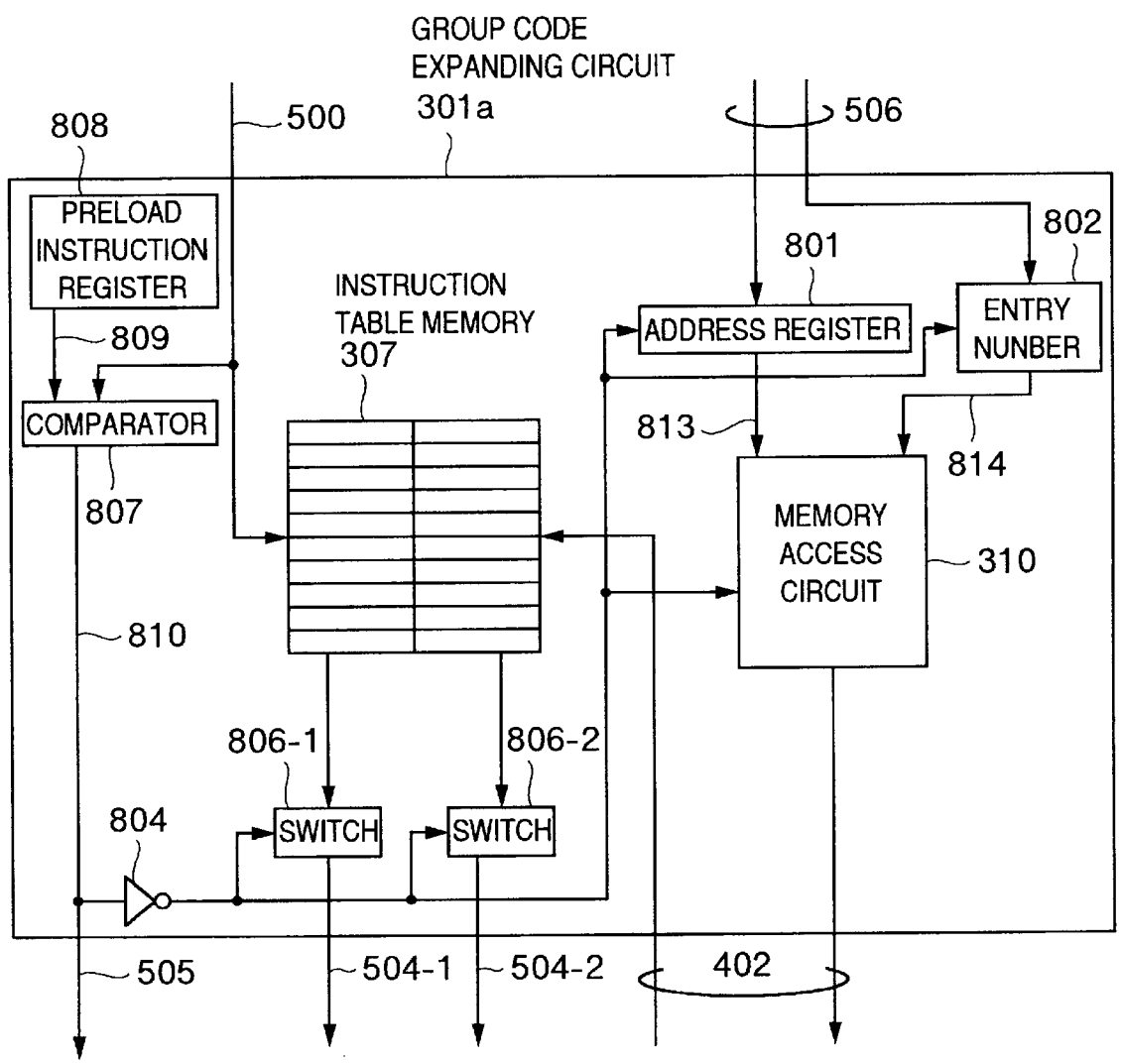
FIG. 4 is a circuit diagram briefly showing a group code expanding circuit to be used by the circuit shown in FIG. 3.

The operation of the processor shown in FIG. 1 will be further described in detail. As shown in FIG. 4, the group code expanding circuit 301a has an instruction table memory 307 for storing the instruction table 30A. In this embodiment, it is assumed that this memory has a capacity capable of storing the whole of the instruction table 30A. This assumption is also applied to other instruction expanding circuits. Prior to executing the program shown in FIG. 12D, an instruction is executed which instruction is used for loading the instruction tables 30A, 30B and 30C shown in FIGS. 12A–12C in the instruction table memories 307 of the instruction expanding circuits 300a, 300b and 300c.

Figure 2D:
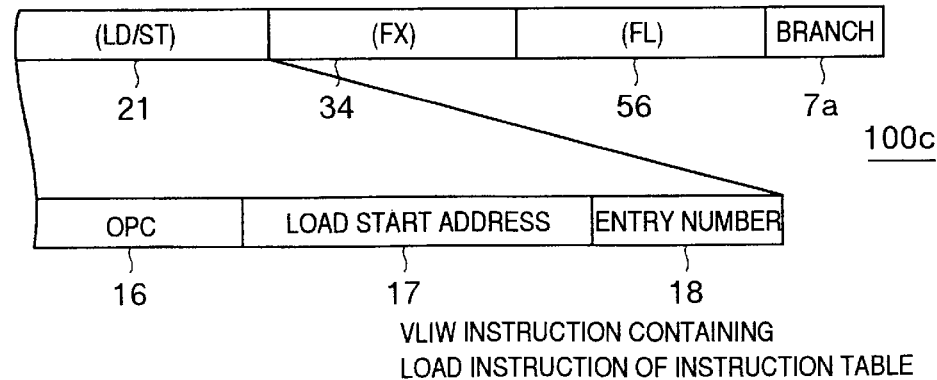
FIG. 2D is a diagram showing the format of a VLIW instruction containing an instruction for preloading an instruction table.

This preload instruction may be set in place of one grouped instruction of the time- and space-compressed VLIW instruction 100b shown in FIG. 2C. FIG. 2D shows a long instruction 100c containing a preload instruction 16 for the instruction expanding circuit 300a. In this long instruction 100c, the preload instruction 16 is contained in the instruction field 21 of the LD/ST group. The operand sub-fields of this preload instruction are set with the start address 17b of an area (block) in the main storage to be loaded (in this example, the start address (sub-field 17) of the instruction table 30A) and the number (sub-field 18) of entries to be loaded. The sum of the length of the OP code 16 of this preload instruction and the length of the operand sub-fields 17 and 18, i.e., the length of the preload instruction, is the same as that of one grouped instruction shown in FIG. 2C. In the following description of processing this preload small instruction, it is considered as the grouped instruction in some cases. NOP instructions are also set to the other fields of this long instruction 100c. In this embodiment, however, the other fields may be set with other grouped instructions or preload instructions for other instruction expanding circuits.

Prior to fetching the instruction series 40 show in FIG. 12D, the instruction fetch unit 202 shown in FIG. 1 fetches the long instruction 100c (FIG. 2D) containing the preload instruction used by the instruction expanding circuit 300a and other long instructions containing the preload instructions for the other instruction expanding circuits. For example, as the long instruction 100c containing the preload instruction for the instruction table 30A is fetched by the instruction fetch unit 202, the contents of a plurality of grouped instruction fields of this long instruction are transferred to the instruction expanding circuits 300a, 300b, 300c and 300d of the instruction expanding unit 300. Therefore, the instruction expanding circuits 300b–300d become ready for expanding other grouped instructions. A long instruction filled with all preload instructions may be used. In this case, if this long instruction is fetched once, preloads for all function units can be completed by one process.

The instruction expanding circuit, for example, the instruction expanding circuit 300a shown in FIG. 3, has the group code "FF" of the invalid instruction (FF instruction) stored in the FF register 309. When the preload small instruction is supplied via the line 403 from the instruction fetch unit 202, the comparator 308 compares "FF" in the register 309 with the OP code of the grouped instruction supplied from a line 403-1. If this comparison does not detect a coincidence, the information in this grouped instruction is permitted to be stored in the queues 304, 305-1, 306-1, 305-2 and 306-2. Namely, the two operands in the transferred preload instruction are distributed to and stored in the first operand queue 305-1, first NOP number queue 306-1, second operand queue 305-2, and second NOP number queue 306-2 via lines 403-2 - 403-5. The OP code of this instruction is transferred to and stored in the group code queue 304 via a line 510. Assuming that this queue is empty before this time, the OP code of this instruction is immediately transferred via a line 500 to the group code expanding circuit 301a, and the two operands are transferred from the queues to the group code expanding circuits 301 via a line 506.

Referring to FIG. 4, a preload instruction register 808 of each group code expanding circuit 301 (e.g., 301a) stores in advance the OP code of the preload instruction. When the OP code is transferred from the group code queue via the line 500, it is compared with the OP code in the preload instruction register 808 by a comparator 807 to judge whether the transferred OP code corresponds to the preload instruction.

If the transferred OP code is coincident with the OP code in the preload instruction register 808, an output 810 of the comparator 807 becomes "1". An address register 801 stores the start address of the instruction table to be preloaded, and an entry number register 802 stores the effective entry number of the instruction table supplied via the line 506. A memory access circuit 310 is activated by the output 810 from the comparator 807 to access the main storage 100 at the location starting from the address stored in the address register 801 to the addresses corresponding to the entry number in the entry number register 802 via a line 402 and read the instruction table 30A and store it in the instruction table memory 307. In this manner, the instruction table 30A is preloaded. The other long instructions containing preload small instructions for the instruction tables 30B and 30C are thereafter sequentially prefetched from the main storage 100 and the preload small instructions are expanded by the instruction expanding circuits 300b and 300c.

Thereafter, the VLIW instruction series shown in FIG. 12D is sequentially fetched by the instruction fetch unit 202 from the main storage 100 shown in FIG. 1. A plurality of grouped instructions of each VLIW instruction are transferred to the instruction expanding circuits 300a–300d. Similar to the preload instruction described previously, in each instruction expanding circuit (FIG. 3), the comparator 308 checks whether the transferred grouped instruction is the invalid instruction (FF instruction). If this grouped instruction is not the invalid instruction (FF instruction), the group code queues 304, operand queue 305-1, NOP number queue 306-1, operand queue 305-2 and NOP number queue 306-2 receive via the lines 403-1 403-5 the group code, the operand group of the first small instruction in the grouped instruction, the NOP number of the first small instruction, the operand group of the second small instruction in the grouped instruction, and the NOP number of the second small instruction. When each queue detects an overflow, it outputs a signal to a signal line 418-1 to request the instruction fetch unit 202 to suspend the transmission of succeeding instructions. This signal is ORed with similar signals 418-2, 418-3 and 418-4 from the other instruction expanding circuits 300b, 300c and 300d by an OR gate 518, and an output of the OR gate is sent via a line 418 to the instruction fetch unit 202. Therefore, any queue in each instruction expanding circuit will not lose information in a small instruction supplied from the instruction fetch unit 202.

The group code at the top of the group code queue 304 is input via the line 500 to the group code expanding circuit 301. In this group code expanding circuit 301, the instruction table memory 307 outputs a plurality of OP codes among the OP code group stored in the instruction table 30A at the location designated by the input group code. An output of the comparator 807 is supplied via an inverter 804 to switches 806-1 and 806-2. If the output of the comparator 807 is "0", i.e., if the OP code supplied via the line 500 does not correspond to the preload instruction, these switches operate to supply the plurality of OP codes read from the instruction table memory 307 to the OP code queues 302-1 and 302-2 via lines 504-1 and 504-2. The output of the comparator 807 is also supplied via a line 505 to the small instruction generating circuit 303-1. If the output of the comparator 807 is "1", i.e., if the OP code supplied via the line 500 corresponds to the preload instruction, the small instruction generating circuit 303-1 is notified that the output of the group code expanding circuit 301 is invalid.

The OP code queues 302-1 and 302-2 are first-in first-out queues. Of a plurality of OP codes input to these queues, the first input OP codes are stored at the top locations of the queues and output to the lines 501-1 and 501-2. The OP code output from the OP code queue 302-1 to the line 501-1 and the operand group stored in the top locations of the operand queue 305-1 are combined to restore one small instruction. This restored small instruction is supplied via a line 50-1 to the small instruction generating circuit 303-1.

Figure 5:
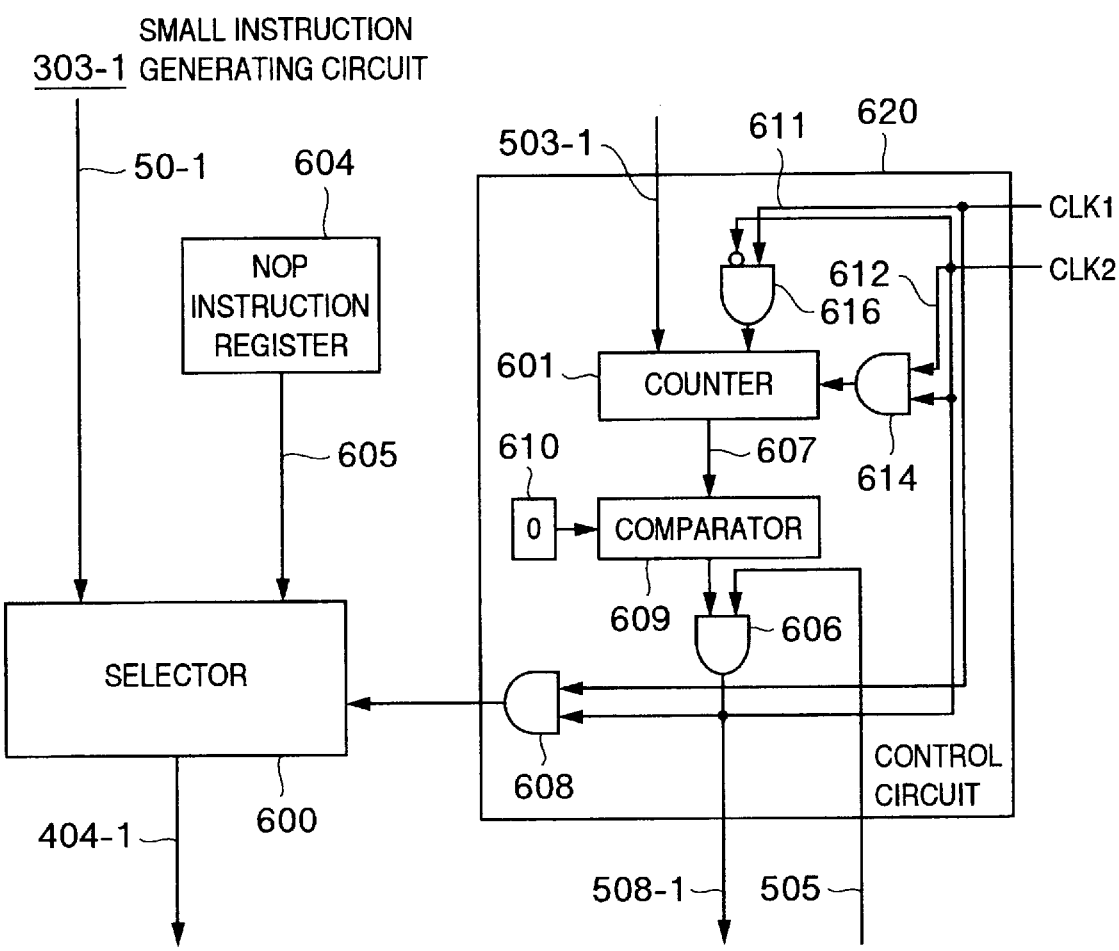
FIG. 5 is a circuit diagram briefly showing a small instruction generating circuit to be used by the circuit shown in FIG. 4.

As shown in FIG. 5, the small instruction generating circuit 303-1 has a selector 600 and a circuit 620 for controlling the select operation of the selector 600. The selector 600 selects either a small instruction input via the line 50-1 or a NOP instruction input via a line 605 from a register 604. A counter 601 of the control circuit 620 counts the NOP number supplied via the line 503-1 from the NOP number queue 306-1 (FIG. 3) to generate NOP instructions same in number as the NOP number. The initial value of the counter 601 is set to "0". A comparator 609 compares the count of the counter 601 with a constant "0" stored in a register 610. If a coincidence is detected, the comparator 609 outputs a value "1". Therefore, when the small instruction is supplied via the line 50-1, the output of the comparator 609 is "1". This output is supplied via an AND gate 606 to an AND gate 608. The AND gate 606 performs a logical product of the output of the comparator 609 and a signal on the line 505 from the group code expanding circuit. If the signal on the line 505 is "0", the output of the AND gate 608 becomes "0" to make the selector 601 output a NOP instruction. Synchronously with a master clock CLK1 of the processor shown in FIG. 1 and supplied via a line 611, the AND gate 608 sends the output "1" of the comparator 609 to the selector 600. In response to this signal, the selector 600 selects the small instruction supplied via the line 50-1 and sends it to a corresponding function unit via a line 404-1.

Synchronously with the output "1" of the AND gate 606 and a half-cycle shifted clock CLK2 on a signal line 612, an AND gate 614 instructs the counter 601 to receive the NOP number on the signal line 503-1. Namely, after a half-cycle from when the small instruction is supplied via the line 50-1, the counter 609 receives the NOP number. Therefore, the output of the comparator 609 becomes "0" thereafter. As a result, when the next clock CLK1 is supplied, the output of the AND gate 610 becomes "0" and the selector 600 selects the NOP instruction in the NOP instruction register 604 and outputs it to a line 404. Since the inverted output of the comparator 609 and the clock CLK1 are input to the AND gate 616, the counter 601 counts down by "1" in response to the clock CLK1. Similarly, the NOP instruction is repeated until the count of the counter 601 becomes "0". In the above manner, a small instruction and a plurality of succeeding NOP instructions are generated. Each time a comparison by the comparator 609 is established, the output of the comparator 609 is transferred via a line 508-1 to the first operand queue 305-1 and OP code queue 302-1, and via the OR gate 509 to the group code queue 304 to thereby notify a selection of information output from these queues. In response to this notice, these queues prepare to output the next information. Similarly, in the small instruction generating circuit 303-2, the output of the comparator 609 is transferred via a line 508-2 to the first operand queue 305-2 and OP code queue 302-2, and via the OR gate 509 to the group code queue 304. In this manner, each time the small instruction generating circuit 303-1 selects one recovered small instruction, the above-described queues output the information of the next VLIW instruction. As already described, when the preload instruction is transferred to the instruction expanding circuit 300a, a notice of this effect is informed to the small instruction generating circuit 303-1 via the line 505.

Figure 13A:
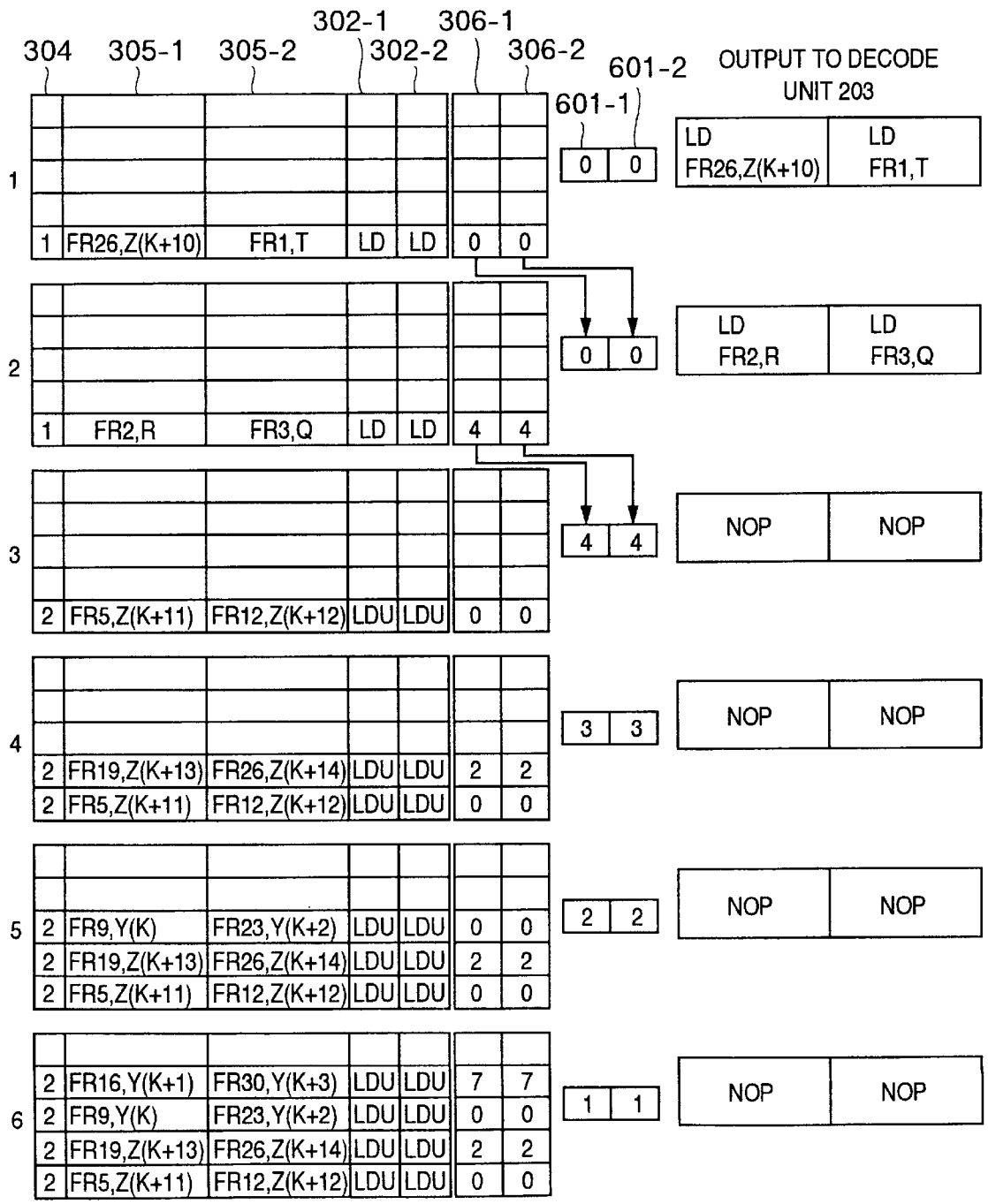
FIGS. 13A, 13B and 13C are diagrams illustrating the execution of the program shown in FIG. 12D.
Figure 13B:
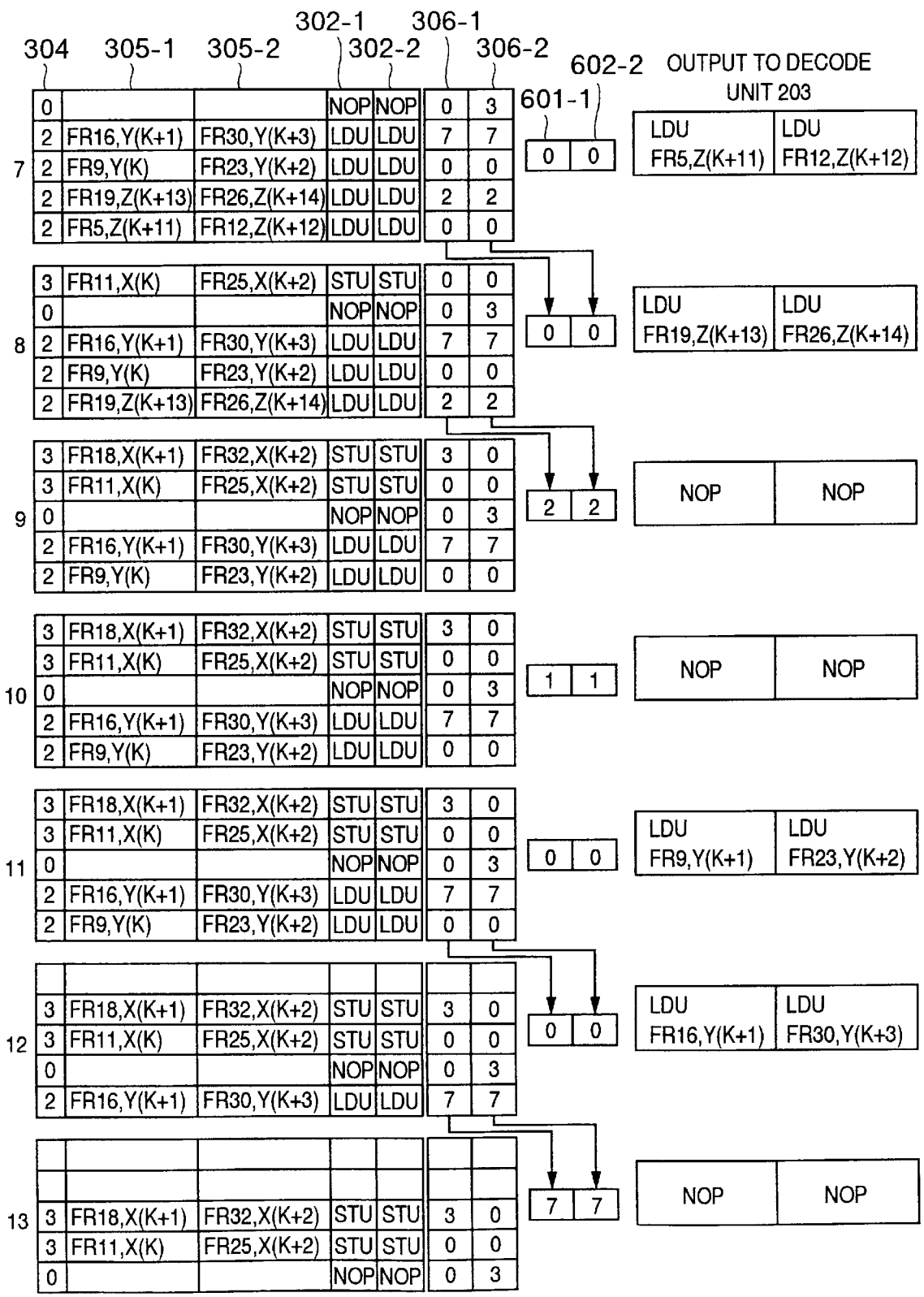
Figure 13C:
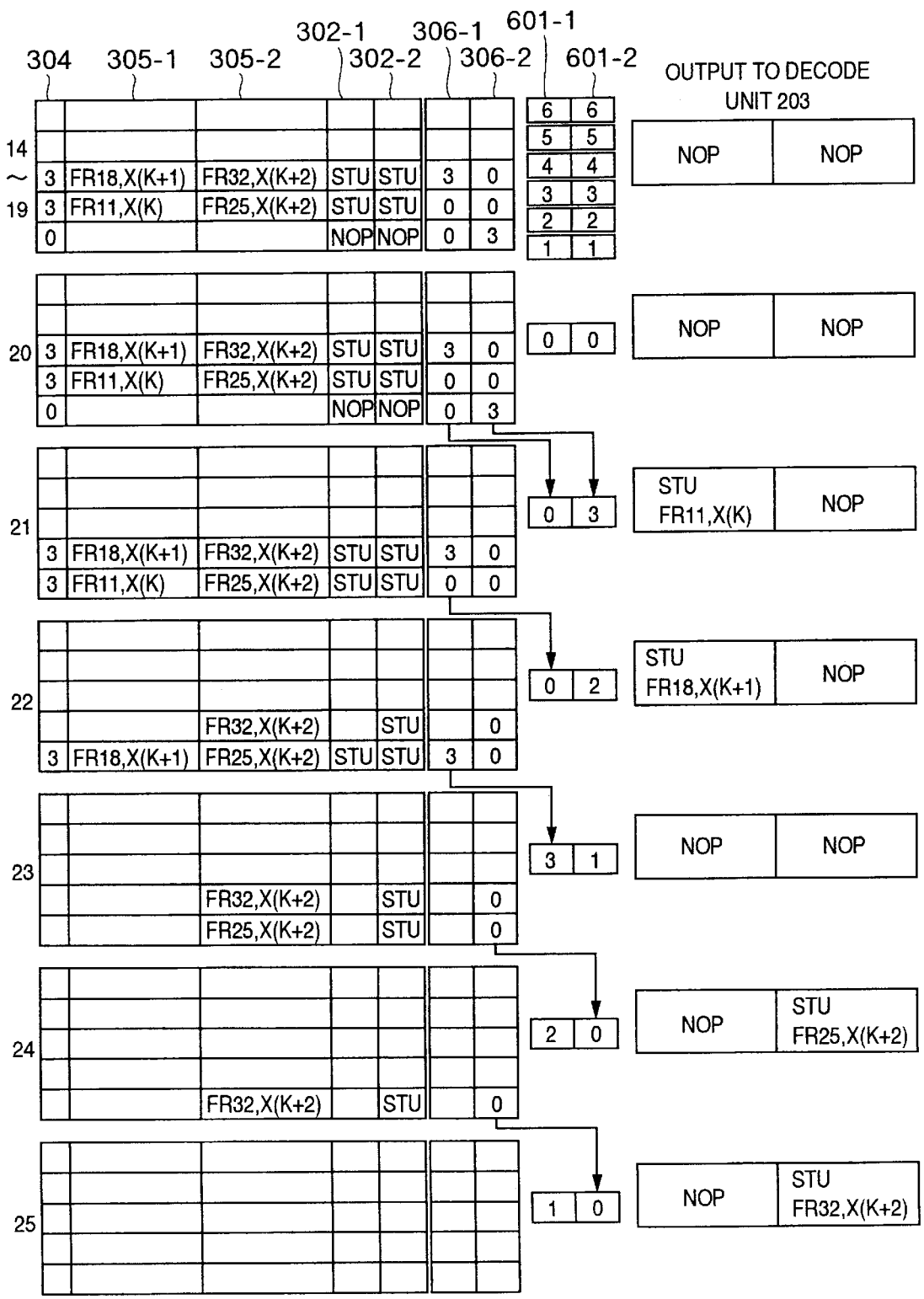

In the following, how the instruction expanding circuit 300a shown in FIG. 3 expands the L/S instruction group in the space-compressed instruction series shown in FIG. 12D will be described more in particular with reference to FIGS. 13A, 13B and 13C. FIGS. 13A, 13B and 13C show the contents of the group code queue 304, operand queues 305-1 and 305-2, OP code queues 302-1 and 302-2 and NOP number queues 306-1 and 306-2, the contents of the NOP number counters 601-1 and 601-2 of the small instruction generating circuit 303-1, and small instructions output to the decode unit 203 from the small instruction generating circuit at each cycle.

As shown in FIG. 13A, at the first cycle, an instruction (1) shown in FIG. 12D is transferred from the instruction fetch unit 202 to the instruction expanding unit 300. As the instruction expanding circuit 300a receives the L/S instruction group in this instruction, the group code "1", the first operand group "FR26, Z(K+10)", the first NOP number "0", the second operand group "FR2, T" and the second NOP number "0" are stored in the group code queue 304, the first operand queue 305-1, the first NOP number queue 306-1, the second operand queue 305-2 and the second NOP number queue 306-2, respectively. Since the information stored in these queues are first information, it is output immediately. The group code expanding circuit 301 outputs a pair of OP codes "LD, LD" at the first entry of the instruction table 30A stored in the instruction table memory to the OP code queues 302-1 and 302-2, because the group code supplied from the group code queue 304 is "1". Since the OP codes "LD" and "LD" supplied to the first and second OP code queues 302-1 and 302-2 are the first OP codes, these OP codes are output immediately to the lines 501-1 and 501-2.

The small instruction generating circuit 303-1 selects a recovered small instruction "LD FR26, Z(K+10)" constituted by the OP code supplied from the first OP code queue 302-1 and the operand output from the first operand queue 305-1. The NOP number counter 601-1 receives the first NOP number "0" supplied from the first NOP number queue 306-1. After the small instruction generating circuit 303-1 selects the recovered small instruction, the queues 304, 305-1 and other queues connected to the small instruction generating circuit 303-1 prepare output information for the next VLIW instruction. Similarly, the small instruction generating circuit 303-2 outputs a small instruction "LD FR1, T" and the NOP number counter 601-1 receives the NOP number "0" supplied from the second NOP number queue 306-2.

At the second cycle, the instruction (2) shown in FIG. 12D is transferred from the instruction fetch unit 202 to the instruction expanding unit 300, and processed in the manner similar to the first cycle. This instruction (2) is different from the first instruction (1) in that the first and second NOP numbers are "4". Therefore, after this instruction is expanded by the instruction expanding circuit 300a, "4" is stored in the NOP counters 601-1 and 601-2.

At the third cycle, the instruction (3) shown in FIG. 12D is transferred from the instruction fetch unit 202 to the instruction expanding unit 300. Similar to the first cycle, information of this instruction is stored in each queue. However, since the values of the NOP counters 601-1 and 601-2 are not "0", the small instruction generating circuits 303-1 and 303-2 of the instruction expanding circuit 300a select the NOP instructions supplied from the registers 604 to the decode unit 203. At this time the counts of the NOP counters 601-1 and 601-2 are decremented. The small instruction generating circuits 303-1 and 303-2 do not select the instruction (3) transferred from the instruction fetch unit 202. Therefore, at this cycle, the instruction (3) is not expanded and information stored in each queue is maintained as it is.

At the fourth to sixth cycles, similar to the third cycle, the instructions (4)–(6) shown in FIG. 12D are sequentially supplied from the instruction fetch unit 202 to the instruction expanding unit 300. At these cycles, since the values in the NOP counters 601-1 and 601-2 are not "0", the small instruction generating circuits 303-1 and 303-2 of the instruction expanding circuit 300a select the NOP instructions supplied from the registers 604, similar to the third cycle. At this time the counts of the NOP counters 601-1 and 601-2 are decremented. Information of the instructions (4)–(6) stored in each queue is maintained as it is. At the end of the sixth cycle, the counts of the NOP counters 601-1 and 601-2 become "0". In the above manner, six pairs of LD/ST instructions of the first six VLIW instructions shown in FIG. 10 are recovered.

As the seventh cycle shown in FIG. 13B, the instruction (7) shown in FIG. 12D is transferred from the instruction fetch unit 202 to the instruction expanding unit 300. The LD/ST small instruction group of this instruction (7) is an instruction obtained by space-compressing a pair of NOP instructions and has no operand as is expressed by empty columns in FIG. 12D. However, in an actual case, in these two fields, a bit pattern of the NOP instruction without the operand sub-field is inserted at the top location of each field.

At the seventh cycle, since the counts of the NOP counters 601-1 and 601-2 are already "0", the instruction expanding circuit 300a restores a non-compressed small instruction in accordance with the information stored in each queue at the top location, similar to the first cycle. In this example, in accordance with the information of the instruction (3), a pair of LD/ST instructions constituting the seventh VLIW instruction shown in FIG. 10 is recovered. Similarly, at the eighth cycle, the instruction (8) shown in FIG. 12D is transferred from the instruction fetch unit 202 to the instruction expanding unit 300. The instruction expanding circuit

300a processes the instruction (8) in a manner similar to the seventh cycle. At this eighth cycle, in accordance with the information of the instruction (4), a pair of LD/ST instructions constituting the eighth VLIW instruction shown in FIG. 10 is recovered. Thereafter, the first and second NOP numbers "2" and "2" of the instruction (8) are stored in the NOP registers 601-1 and 601-2.

At the ninth and tenth cycles, the instructions (9) and (10) shown in FIG. 12 are transferred from the instruction fetch unit 202 to the instruction expanding unit 300. At these cycles, since the counts of the NOP counters 601-1 and 601-2 are not "0", the small instruction generating circuits 303-1 and 303-2 of the instruction expanding circuit 300a output the NOP instructions, similar to the third cycle. The counts of the NOP counters 601-1 and 601-2 are set to "0" during the tenth cycle.

The instruction (1) transferred from the instruction fetch unit 202 at the tenth cycle is the valid instruction (FF instruction). As the comparator 308 detects that the OP code of the instruction (10) is the same as "FF" in the FF resister 309, each queue of the instruction expanding circuit 300a does not receive the information of this instruction. This process for the invalid instruction is executed in the same manner as the 11th to 13th cycles.

At the 11th cycle, since the counts of the NOP counters 601-1 and 601-2 are "0", the instruction expanding circuit 300a restores non-compressed instructions in accordance with the information stored in each queue at its top location, similar to the seventh cycle. In this example, in accordance with the information of the instruction (5), a pair of LD/ST instructions constituting the 11th VLIW instruction shown in FIG. 10 is recovered. After this recovery, the first and second NOP numbers "0" and "0" of the instruction (5) are set to the NOP counters 601-1 and 601-2. Therefore, also at the next 12th cycle, since the counts of the NOP counters 601-1 and 601-2 are "0", the instruction expanding circuit 300a restores a pair of LD/ST instructions constituting the 12th VLIW instruction shown in FIG. 10 and corresponding to the instruction (6) in this example, in accordance the information stored in each queue at the top location, similar to the 11th cycle. After this recovery, the first and second NOP numbers "7" and "7" of the instruction (6) are set to the NOP counters 601-1 and 601-2.

During the period from the 13th cycle (FIG. 13B) to the 19th cycle (FIG. 13C), the counts of the NOP counters 601-1 and 601-2 are not "0". Therefore, the instruction expanding circuit 300a repetitively outputs the NOP instruction similar to the third to sixth cycles. After the NOP instruction is output at the 19th cycle, the counts of the NOP counters 601-1 and 601-2 become "0".

At the cycles after the 14th cycle, if a predicted branch destination is established, this predicated instruction is sequentially supplied at the prefetch stage to the instruction expanding circuits 300a–300d. If the predicated branch destination is not established, it is determined that there is no input. If the predicted branch destination is established and the predicted instruction is stored in each queue of the instruction expanding circuit, then the following operation is performed. If a branch having a different direction from the predicted branch direction occurs, the branch unit 207 notifies a prediction miss to each instruction expanding circuit via a signal line 415, and each instruction expanding circuit invalidates the instruction in each queue.

At the 20th cycle, since the counts of the NOP counters 601-1 and 601-2 are "0", the instruction expanding circuit 300a restores a pair of NOP instructions constituting the 20th VLIW instruction shown in FIG. 10 and corresponding to the instruction (7) (this instruction is obtained by space-compressing a pair of NOP instructions) in this example, in accordance the information stored in each queue at the top location. After this recovery, the first and second NOP numbers "0" and "3" of the instruction (7) are set to the NOP counters 601-1 and 601-2. Since the counts of the NOP counters 601-1 and 601-2 are different, the small instruction generating circuits 303-1 and 303-2 operate differently thereafter.

At the 21st cycle, since the count of the NOP counter 601-1 is "0", the small instruction generating circuit 303-1 of the instruction expanding circuit 300a restores the first small instruction "STU FR11, X(K)" in accordance with the information stored in the OP code queue 302-1 and first operand queue 305-1 at the top locations thereof, in this example, in accordance with the information of the first small instruction used for generating the instruction (8). After this recovery, the first NOP number stored in the first NOP number queue 306-1 at the top location, in this example, the value "0", is set to the NOP counter 601-1. On the side of the small instruction generating circuit 303-2, since the count of the NOP counter 601-2 is not "0", the NOP instruction is output and the NOP counter is decremented. As a result, the instruction expanding circuit 300a recovers the LD/ST instruction group constituted of a pair of a valid small instruction and a NOP instruction. This instruction group is a portion of the 21th instruction shown in FIG. 10. In this embodiment, a small instruction group containing a valid small instruction and a NOP instruction can be recovered by using a portion of a space-compressed instruction group. The remaining portion of the space-compressed instruction group can be used, as will be described below, for recovering another small instruction group containing another valid small instruction and a NOP instruction.

At the 22nd cycle, since the count of the NOP counter 601-1 is "0", the small instruction generating circuit 303-1 of the instruction expanding circuit 300a restores, similar to the 21th cycle, the first small instruction "STU FR18, X(K+1)" in accordance with the information stored in the OP code queue 302-1 and first operand queue 305-1 at the top locations thereof, in this example, in accordance with the information of the first small instruction used for generating the instruction (9). After this recovery, the first NOP number stored in the first NOP number queue 306-1 at the top location, in this example, the value "3", is set to the NOP counter 601-1. On the side of the small instruction generating circuit 303-2, since the count of the NOP counter 601-2 is not "0", the NOP instruction is output and the NOP counter is decremented.

At the 23rd, since both the NOP counters 601-1 and 601-2 are not "0", the small instruction generating circuits 303-1 and 303-2 of the instruction expanding circuit 300a output NOP instructions and the NOP counters 601-1 and 601-2 are decremented.

At the 24th cycle, since the count of the NOP counter 601-2 is "0", the small instruction generating circuit 303-2 of the instruction expanding circuit 300a restores the second small instruction "STU FR25, X(K+2)" in accordance with the information stored in the second OP code queue 302-2 and second operand queue 305-2 at the top locations thereof, in this example, in accordance with the information of the second small instruction used for generating the instruction (8). After this recovery, the second NOP number stored in the second NOP number queue 306-2 at the top location, in this example, the value "0", is set to the NOP counter 601-2. On the side of the small instruction generating circuit 303-1, since the count of the NOP counter 601-1 is not "0", the NOP instruction is output and the NOP counter is decremented. As a result, the instruction expanding circuit 300a recovers a LD/ST instruction group constituted of a pair of a NOP instruction and a valid small instruction. This instruction group is a portion of the 24th instruction shown in FIG. 10. As described above, in this embodiment, a small instruction group containing a valid small instruction and a NOP instruction can be recovered by using the remaining information of the instruction (8) partially recovered at the 21st cycle.

At the 25th cycle, the small instruction generating circuits 303-1 and 303-2 of the instruction expanding circuit 300a recover a NOP instruction and a small instruction "STU FR32, X(K+2)", in a manner similar to the 24th cycle. Since the branch instruction is executed at the 25th cycle, the branch destination is determined so that it can be judged whether the branch prediction is correct or not. If correct, the information stored in each queue is used to expand the instruction by the above-described procedure. If not correct, the instruction stored in each queue based on the branch prediction is invalidated so that the instruction expansion can be conducted in the manner similar to the first cycle shown in FIG. 13A. As appreciated from the foregoing description, in this embodiment, a time- and space-compressed instruction group is expanded to restore a plurality of non-compressed small instructions and NOP instructions.

It is assumed here that the OP code field 10 of the non-compressed VLIW instruction shown in FIG. 2A is 12 bits and the operand field 11 is 20 bits. Each small instruction has therefore a length of 32bits, and the VLIW instruction shown in FIG. 2A has a length of 32 bits×7 fields=244 bits. The program shown in FIG. 10 written by VLIW instructions has a capacity of 224 bits×25 instructions=700 bytes. As the program shown in FIG. 10 is time-compressed by using the VLIW instructions shown in FIG. 2B, the number of necessary instructions is reduced to 13 instructions as shown in FIG. 11. As the program shown in FIG. 11 is space-compressed by using the VLIW instructions shown in FIG. 2C, the combinations of OP codes of instructions of this program are four, five and one respectively for the L/S instruction group, FL instruction group and FX instruction group, as shown in FIGS. 12A, 12B and 12C. Therefore, the group code 13 of the space-compressed VLIW instruction shown in FIG. 2C is sufficient if it has there bits. The group code is not necessary for the branch instruction sub-field 7a of this VLIW instruction. Assuming that the NOP number sub-field 12 is three bits, the length of a VLIW instruction is three bits (length)×three groups+20 bits (operand length) ×six sub-fields (other than branch instruction)+32 bits (branch instruction)+three bits (NOP number sub-field for branch instruction)=182 bits, because the VLIW instruction has two LD/ST instructions, two floating point calculation instructions, and one branch instruction. Therefore, even if the bit length of one VLIW instruction increases because of the NOP number sub-field used for time compression, a shorter bit length can be obtained than the non-compressed VLIW instruction, by using the group code for space compression.

The space-compressed program has 13 instructions so that the size of this program is about 296 bytes. The total number of entries of the instruction tables 30A, 30B and 30C is 10 entries so that the size of these tables is 30 bytes. The total size of both the program and the tables is reduced by about 53.4% of the original program. As compared with the fourth reference document (22 VLIW instructions×32-bit small instruction×seven fields≈616 bytes), the total size of the instruction tables is as very small as about 30 bytes which is one 21st the fourth reference document. Therefore, the instruction tables may be stored in a faster memory provided in the processor.

A small instruction of the codes shown in FIG. 10 and compressed by the method of the fourth reference document becomes as long as 32 bits because it has no NOP number field. There are 22 different instruction combinations, and the fields which can be shared are only for the fields of NOP instructions. Therefore, if five bits are assigned to a code representative of an instruction, the total size of the program is five bits ×25 instructions+32 bits×seven fields×22 combinations+622 bytes (including 616 bytes for instruction tables). This size reduction is only about 11% of the original program. In the case of the first reference document, assuming that a delay cycle field added to each VLIW instruction is three bits, the number of instructions is reduced to 21 instructions in this example because there are four instructions having all fields filled with NOP instructions. However, one VLIW instruction is 32 bits×seven fields+ three bits=227 bits. The total size of the program is therefore about 596 bits, which means a reduction of about 15% of the original program. In the case of the second reference document, assuming that a delay cycle field added to each VLIW instruction is three bits same as the case of the first reference document, one VLIW instruction is 32 bits×seven fields+three bits×7=243 bits. However, the program has 13 instructions as shown in FIG. 11 because of the effects of removing NOP instructions so that the total size of the program is about 398 bytes, which means a reduction of about 43% of the original program.

The necessary capacity of the memory 307 used in this embodiment for storing an instruction table of the group code expanding circuit 301 can be reduced in the following manner. Assuming that the program shown in FIG. 12D is used, the sizes of the instruction tables 30A, 30B and 30C are different and that of the instruction table 30A is largest. The larger the size of the instruction table, as the number of OP code types of the program increases more. In the above embodiment, the instruction table memory of each instruction expanding circuit is required to store the whole of one instruction table. The instruction expanding circuit storing a large instruction table is required to provide a large instruction table memory. A smaller instruction table memory than the above embodiment may be used in the following manner. Namely, an instruction table stored in one instruction expanding circuit is divided into a plurality of partial instruction tables. Upon a request from a program, a necessary partial instruction table is read from the main memory and copied to the instruction table memory of the instruction expanding circuit.

For example, the instruction table 30A is divided into a plurality of partial instruction tables, the instruction table 30A storing a plurality of OP code pairs corresponding to a plurality of group codes which are used during the execution of the space-compressed program shown in FIG. 12D. The start partial instruction table among these partial instruction tables is preloaded from the main storage 100 to the group code expanding circuit 301. During the execution process of the space-compressed program shown in FIG. 12D, a proper succeeding partial instruction table is copied from the main storage 100.

In order to realize the above operation, the program shown in FIG. 12D is divided into a plurality of partial programs during compiling, and a partial instruction table is generated which stores OP code pairs of the VLIW instruction contained in each partial program. A plurality of partial instruction tables generated in this manner are stored in the main storage 100. A compressed long instruction is embedded at the top of each partial program, the long instruction containing a preload instruction for preloading the partial instruction table to be used by each partial program in the main storage 100. This long instruction has the same format as the long instruction 100d shown in FIG. 2D. In this case, the other fields of this long instruction may be set with valid grouped instructions other than NOP instructions to be used for other instruction expanding circuits. The circuit structure of the process is the same as that of the above-described embodiment. The structure of the instruction table of this modification is not necessarily applied to all the instruction expanding circuits, but may be applied to only the instruction expanding circuit having a possibility of using a relatively large instruction table.

In order to reduce the size of the instruction table memory, an instruction table memory of a cache type may be used.

Figure 6:
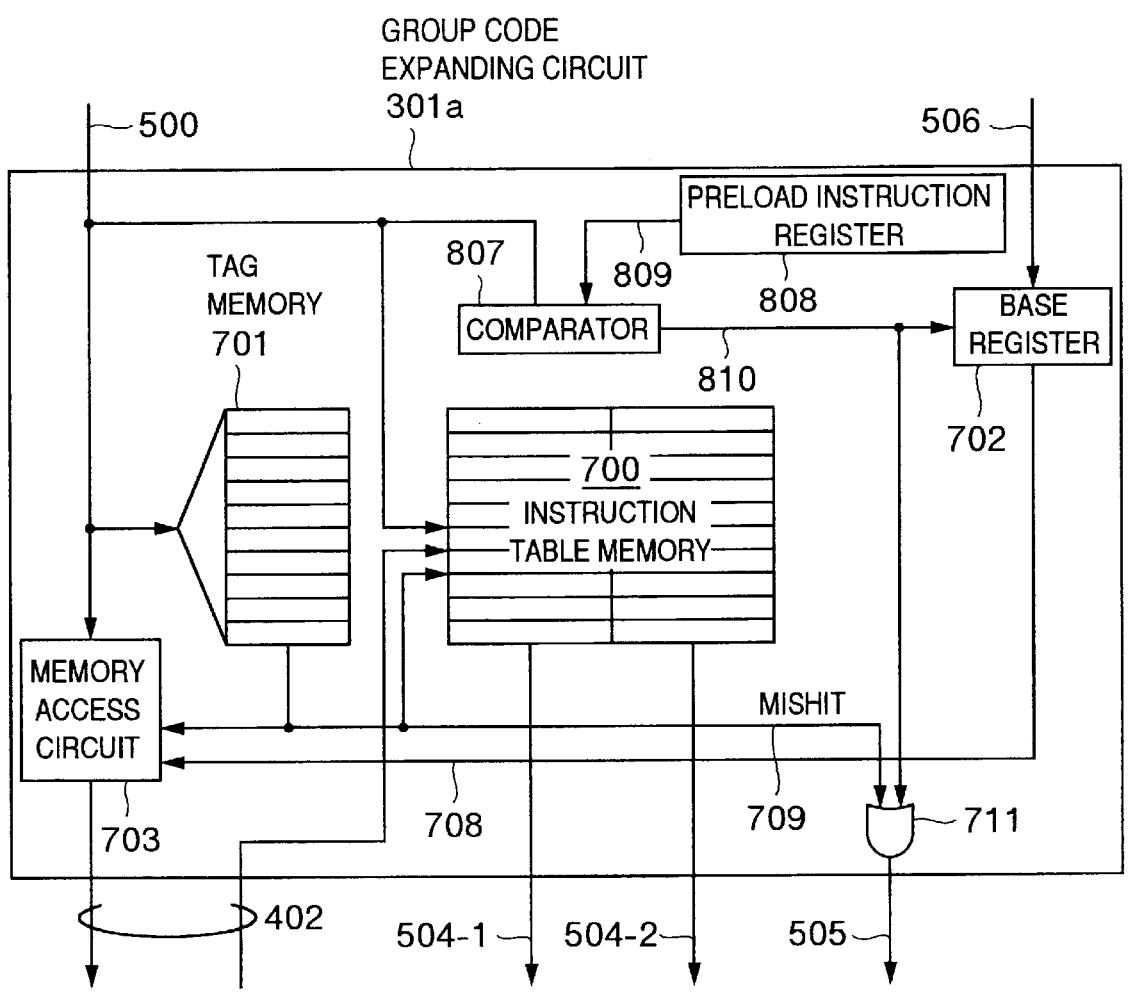
FIG. 6 is a circuit diagram briefly showing another example of the group code expanding circuit to be used by the VLIW processor of this invention.

In this case, a group expanding circuit 300a shown in FIG. 6 is used in place of the group expanding circuit 300a shown in FIG. 4. Prior to fetching the instruction series shown in FIG. 12D from the main storage 100, a long instruction containing a preload instruction shown in FIG. 2D is used by the instruction expanding circuit 300a to preload the contents of the instruction table 30A. In this case, the preload instruction has no valid information about the entry number field 18. This preload instruction is not used for preloading the instruction table 30A, but used for setting the load start address to the group code expanding circuit 300a.

Referring to FIG. 6, a preload instruction register 808 stores in advance the OP code of the preload instruction like that shown in FIG. 4. Each time a grouped instruction is supplied from the group code queue 304 via the line 500, the comparator 807 compares the OP code with that stored in the preload instruction register 808. If a coincidence is detected during this comparison, the supplied grouped instruction is considered as the preload instruction. At this time, the load start address 17 supplied via the signal line 506 is stored in a base register 702 as the base address of the memory area in which the instruction table 30A is stored. An output of the comparator 807 is also supplied to the small instruction generating circuits 303-1 and 303-2 via a line 810, an OR gate 711, and the line 505 to instruct these circuits to generate NOP instructions, similar to the case of FIG. 4. The preload instruction is executed in the manner similar to the above for the other instruction expanding circuits.

Thereafter, the instruction series shown in FIG. 12D is sequentially fetched. Each time the group code of each instruction is supplied via the line 500, a tag memory 701 and an instruction table memory 700 are accessed by using the group code. The tag memory 701 is used for storing a plurality of group codes at corresponding memory locations thereof. The instruction table memory 700 is used for storing a plurality of OP codes corresponding to a plurality of group codes registered in the tag memory 701, at corresponding memory locations thereof.

If the tag memory 701 is accessed by using the group code on the line 500 and this group code is mishit, the tag memory 701 outputs a mishit signal to a line 709 and stores therein the group code at the corresponding memory location thereof. The memory access circuit 703 has a circuit (not shown) for generating a main storage address in response to this mishit signal by adding the base address in the base register 702 to the group OP code on the line 500, and another circuit (not shown) for reading an OP code pair corresponding to the group code from the instruction table 30A stored in the main storage 100, via a line 402. In response to the mishit signal, the instruction table memory 700 stores therein the OP code pair read from the main storage 100 by the read circuit via the line 402, at the memory location corresponding to the OP code on the line 500. The read OP code pair is further supplied, as the valid OP code pair, via the lines 504-1 and 504-2 to the non-compressed OP code queues 302-1 and 302-2 (FIG. 3). The mishit signal is supplied via the line 709 and OR gate 711 to the small instruction generating circuits 303-1 and 303-2 (FIG. 3) to instruct these circuits to generate NOP instructions.

The above operation is performed for each of a plurality of succeeding group codes supplied from the group code queue 304. If the tag memory 701 accessed by using the succeeding group code supplied via the line 500 hits, the instruction table memory 700 supplies the OP code pair stored at the memory location corresponding to this group code, as the valid OP code pair, to the non-compressed OP code queues 302-1 and 302-2 (FIG. 3) via the lines 5-4-1 and 504-2.

In the example shown in FIG. 6, only when the group code is not being stored in the tag memory 701, the corresponding OP code pair is fetched from the main storage. Therefore, the size of the instruction table memory 700 can be reduced more than the example of FIG. 4.

In order to reduce the size of the instruction table memory, the fact that a use frequency of an OP code pair by the program is different for each OP code pair may be used. This example uses a fixed instruction table memory for fixedly storing a plurality of frequently used OP code pairs and a variable instruction table memory for storing a plurality of OP code pairs not frequently used.

Figure 7:
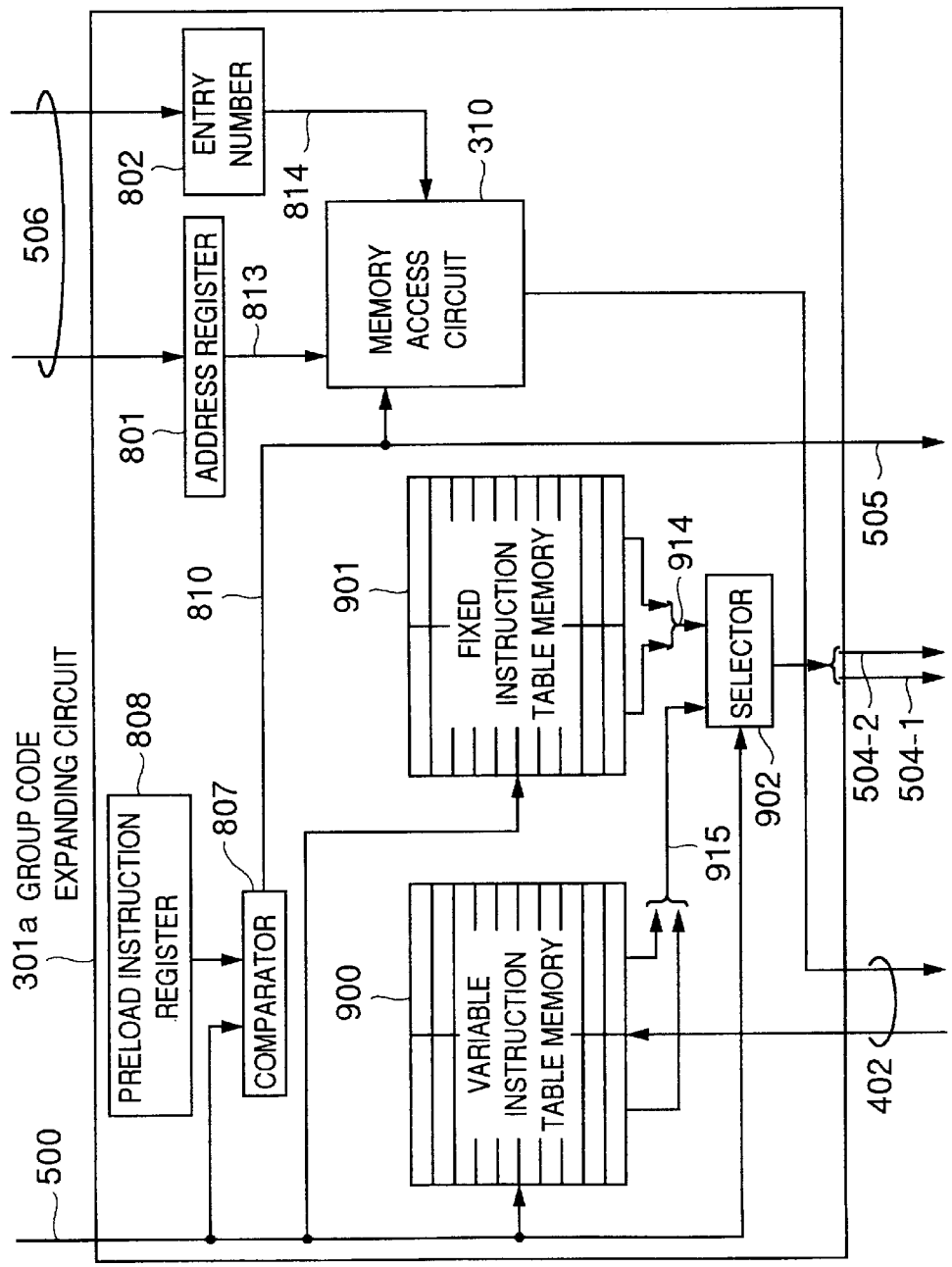
FIG. 7 is a circuit diagram briefly showing still another example of the group code expanding circuit to be used by the VLIW processor of this invention.

In the group code expanding circuit 301a shown in FIG. 7, reference numeral 901 represents a fixed instruction table memory, and reference numeral 900 represents a fixed instruction table memory. The fixed instruction table memory 901 stores a plurality of OP code pairs corresponding to a plurality of predetermined group codes. No particular instruction table is not loaded from the main storage 100 to this memory 901. A partial instruction table necessary during the execution of the program shown in FIG. 12D is stored in the variable instruction table memory 900. In this example, a program to be executed is divided into a plurality of partial programs, a corresponding partial instruction table is determined and stored in the main storage 100, and a long instruction shown in FIG. 2D and containing a preload instruction for preloading the partial instruction table used by each partial program is embedded in each partial program at the top location. These operations are the same as the modification described earlier.

However, in the example shown in FIG. 7, the partial instruction table stores a plurality of OP code pairs corresponding to a plurality of group codes used by each partial program, excepting those OP codes stored in the fixed instruction table memory 301. Each group code has the number of bits allowing to discriminate between the fixed instruction table and variable instruction table. For example, the group code corresponding to the OP code pair stored in the fixed instruction table has the most significant bit "0", whereas the group code corresponding to the OP code pair stored in the variable instruction table has the most significant bit "1".

The preload instruction added to the top location of each partial program operates to read the partial instruction table from the main storage 100, which is the same as the modification described previously. In this example, the read partial instruction table is stored in the variable instruction table memory 900. In accordance with the group code supplied via the line 500, the two instruction table memories 900 and 901 are accessed at the same time, and a proper one of the read two OP code pairs is selected by a selector 902 in accordance with the most significant bit of the group code. The selected OP code pair is supplied to the non-compressed OP code queues 302-1 and 302-2 (FIG. 3) as the valid OP code pair. As appreciated from the foregoing description, in this example, the size of the partial instruction table can be reduced, while also reducing the number of operations of loading the partial instruction table from the main storage 100 to the group code expanding circuit.

A further modification is possible wherein the fixed instruction table is preloaded from the main storage 100 to the memory 901 before the program is executed. The memories 900 and 901 may use memories of a cache type described earlier.

As described so far, each small instruction of a VLIW instruction is divided into an OP code and an operand sub-field, and a sub-field for writing the number of succeeding NOP instructions is provided in the operand sub-field. Accordingly, the number of NOP instructions can be reduced, the time density of valid instructions can be increased, and the use efficiency of the main storage and an instruction cache can be improved. Furthermore, the number of combinations of OP code sub-fields of small instructions contained in VLIW instructions can be reduced so that a possibility of using the same group code representative of the same pair of OP code sub-fields increases. Since a plurality of OP codes share the same sub-field, even if the instruction parallel degree becomes high, only the number of operand fields of the VLIW instruction is increased so that the length of the VLIW instruction can be suppressed from being elongated more than conventional method.

Furthermore, since the structure of the compressed instruction expanding mechanism is simple, the machine cycle is not adversely affected and the long instruction with a high compression factor can be executed fast.

Still further, since the time compression is performed by reducing NOP instructions and the valid small instruction is fetched before it is executed, it is possible to check in advance the OP codes of a branch instruction and an L/S instruction. Therefore, prediction of a branch destination address and data prefetch can be realized.

What is claimed is:

1. A VLIW instruction processor comprising:
   a long instruction supply circuit which sequentially supplies a plurality of compressed long instructions constituting a program to be executed;
   an instruction expanding unit which expands one compressed long instruction supplied from said long instruction supply circuit and generates a plurality of small instructions; and
   a plurality of function units which execute the plurality of small instructions in parallel,
   wherein the plurality of function units are divided into a plurality of function unit groups;
   wherein said instruction expanding unit has a plurality of instruction expanding circuits operating in parallel and provided in correspondence with one of the plurality of function unit groups;
   wherein each compressed long instruction has a plurality of instruction fields corresponding to one of the plurality of function unit groups, each instruction field includes a compressed, grouped instruction representative of a group of small instructions to be executed in parallel by each function unit corresponding to said each instruction field, the compressed, grouped instruction being represented by a smaller number of bits than the number of total bits of the group of small instructions;
   wherein each instruction expanding circuit expands a compressed, grouped instruction in a long instruction supplied from said instruction supply unit, the compressed, grouped instruction being contained in one instruction field corresponding to one function unit group corresponding to said each instruction expanding circuit, generates a group of small instructions represented by the grouped instruction, and outputs in parallel the generated group of small instructions to the corresponding one function unit group;
   wherein the compressed, grouped instruction contained in each instruction field of each long instruction includes a compressed group code representative of a group of operation codes (OP codes) necessary for each of the group of small instructions represented by the grouped instruction, the compressed group code being represented by the smaller number of bits than the number of total bits of the group of OP codes, and a group of operand information sets representative of at least one operand necessary for one of the croup of small instructions;
   wherein each instruction expanding circuit comprises:
   a group code expanding circuit which expands the compressed group code in a long instruction supplied from said instruction supply unit, the compressed group code being contained in an instruction field corresponding to said each instruction expanding circuit, generates a group of OP codes necessary for the group of small instructions represented by the group code, and outputs in parallel the croup of generated OP codes, and
   a small instruction generating unit which generates a croup of small instructions by combining each of the group of output OP codes with one of the croup of operand information sets, and outputs in parallel the group of generated small instructions to the corresponding one function unit group corresponding to said each instruction expanding circuit;
   wherein the compressed group code in each instruction field of each long instruction is set as a pointer to an entry of one instruction table among a plurality of predetermined instruction tables;
   wherein the plurality of instruction tables each register a plurality group of OP codes;
   wherein each instruction table is set in correspondence with each instruction field of a plurality of long instructions, said each instruction field corresponding to each of the plurality of function unit groups;
   wherein combinations of the plurality group of OP codes registered in each instruction table are combinations of a plurality group of unique OP codes, among the combinations of a plurality group of OP codes represented by a plurality of compressed group codes in a plurality of instruction fields corresponding to said each instruction table and contained in the plurality of long instructions; and
   wherein one entry of each instruction table registers one combination of a group of OP codes represented by the group code of each instruction field contained in each long instruction.

2. A VLIW instruction processor according to claim 1, wherein:

the group code expanding circuit in each instruction expanding circuit includes a memory for storing combinations of the plurality group of OP codes represented by the plurality of group codes, and in response to one group code supplied from said long instruction supply circuit, outputting one combination of a plurality of OP codes represented by the supplied group code, among the plurality group of OP codes;

the combinations of the plurality group of OP codes stored in said memory are at least a portion of the combinations of the plurality group of OP codes registered in one of the plurality of instruction tables; and the one of the plurality of instruction tables is set in correspondence with the same instruction fields of the plurality of long instructions corresponding to one function unit group corresponding to the corresponding instruction expanding circuit.

3. A VLIW instruction processor according to claim 2, wherein:

the plurality of instruction tables are stored in a main storage connected to the VLIW instruction processor; and the VLIW instruction processor further comprises a circuit for storing, in response to a particular load instruction contained in the program, the combinations of the plurality group of OP codes belonging to one instruction table stored in said main storage at a storage location designated by the particular load instruction, in said memory contained in one of the plurality of instruction expanding circuits.

4. A VLIW instruction processor according to claim 2, wherein said memory in the group code expanding circuit contained in at least one of the plurality of instruction expanding circuits has a capacity sufficient for storing the combinations of the plurality group of OP codes registered in one instruction table corresponding to ones of an instruction field in the plurality of long instructions corresponding to one function unit group corresponding to said at least one of the plurality of instruction expanding circuits.

5. A VLIW instruction processor according to claim 2, wherein:

at least one of the plurality of instruction tables includes a plurality of partial instruction tables set in correspondence with a plurality of partial programs of the program;

the plurality of partial instruction programs are stored in said main storage; and the VLIW instruction processor further comprises a circuit for storing, prior to executing each partial program of the program, the combinations of the plurality group of OP codes registered in one of the plurality of partial instruction tables stored in said main storage, into said memory contained in at least one of the plurality of instruction expanding circuits.

6. A VLIW instruction processor according to claim 2, wherein:

said memory of said group code expanding circuit contained in at least one of the plurality of instruction expanding circuits includes:

a first memory for storing combinations of a plurality group of OP codes corresponding to a plurality of predetermined group codes; and a second memory for storing combinations of a plurality of other OP codes corresponding to a plurality of group codes other than the plurality of predetermined group codes, and the VLIW instruction processor comprises:

a first circuit for storing the combinations of the plurality of OP codes stored in said main storage, in said second memory; and a second circuit for instructing said first circuit to store the combinations of a plurality group of different OP codes during the execution of the program.

7. A VLIW instruction processor according to claim 3, wherein said group code expanding circuit contained at least one of the plurality of instruction expanding circuits includes:

a circuit for checking whether a combination of a plurality of OP codes corresponding to each group code supplied from said instruction supply circuit to said at least one instruction expanding circuit is stored in said memory in the group expanding circuit; and a circuit for storing at least the combination of the plurality of OP codes stored in said main storage, in said memory, if it is judged that the combination of the plurality of OP codes is not stored in said memory.

8. A VLIW instruction processor comprising:

a long instruction supply circuit which sequentially supplies a plurality of long instructions constituting a program to be executed;

a plurality of function units which executes a plurality of small instructions in parallel; and an instruction supply unit which supplies a plurality of small instructions designated by a long instruction supplied from said long instruction supply circuit, to the plurality of function units, wherein each long instruction has a plurality of instruction fields each corresponding to one of the plurality of function units, each instruction field including at least one small instruction and bit information for designating a NOP number associated with said one small instruction;

wherein said NOP number represents the number of NOP instructions to be executed by one function unit corresponding to each instruction field which one function unit executed said one small instruction;

wherein said instruction supply unit includes a plurality of small instruction generating circuits each provided in correspondence with each of the plurality of function units; and wherein each small instruction generating circuit comprises:

a selector circuit which supplies one small instruction associated with the bit information contained in a corresponding instruction field of one long instruction supplied from said long instruction supply circuit to one function unit corresponding to said each small instruction generating circuit, and after said one small instruction is supplied, sequentially supplies NOP instructions same in number as that designated by the bit information contained in said corresponding instruction field to said corresponding function unit, and a control circuit which inhibits said selector circuit to supply a small instruction contained in a succeeding long instruction supplied from said long instruction supply circuit to said corresponding function unit, until the NOP instructions same in number as that designated by the bit information are supplied completely.

9. A VLIW instruction processor comprising:

a long instruction supply circuit which sequentially supplies a plurality of compressed long instructions constituting a program to be executed;

an instruction expanding unit which expands one compressed long instruction supplied from said long instruction supply circuit and generates a plurality of small instructions; and a plurality of function units which execute the plurality of small instructions in parallel, wherein the plurality of function units are divided into a plurality of function unit groups;

wherein said instruction expanding unit has a plurality of instruction expanding circuits operating in parallel and provided in correspondence with one of the plurality of function unit groups;

wherein each compressed lone instruction has a plurality of instruction fields corresponding to one of the plurality of function unit groups, each instruction field includes a compressed, grouped instruction representative of a group of small instructions to be executed in parallel by each function unit corresponding to said each instruction field, the compressed, grouped instruction being represented by a smaller number of bits than the number of total bits of the group of small instructions;

wherein each instruction expanding circuit expands a compressed, grouped instruction in a long instruction supplied from said instruction supply unit, the compressed, grouped instruction being contained in one instruction field corresponding to one function unit group corresponding to said each instruction expanding circuit, generates a group of small instructions represented by the groused instruction, and outputs in parallel the generated group of small instructions to the corresponding one function unit group;

wherein the compressed, grouped instruction contained in each instruction field of each long instruction includes a compressed group code representative of a group of operation codes (OP codes) necessary for each of the group of small instructions represented by the grouped instruction, the compressed group code being represented by the smaller number of bits than the number of total bits of the group of OP codes, and a group of operand information sets representative of at least one operand necessary for one of the group of small instructions;

wherein each instruction expanding circuit comprises:

a group code expanding circuit which expands the compressed group code in a long instruction supplied from said instruction supply unit, the compressed group code being contained in an instruction field corresponding to said each instruction expanding circuit, generates a croup of OP codes necessary for the group of small instructions represented by the group code, and outputs in parallel the group of generated OP codes, and a small instruction generating unit which generates a group of small instructions by combining each of the group of output OP codes with one of the group of operand information sets, and outputs in parallel the group of generated small instructions to the corresponding one function unit group corresponding to said each instruction expanding circuit;

wherein the compressed, grouped instruction contained in each instruction field of each long instruction further includes a plurality of NOP numbers each corresponding to each of a plurality of small instructions represented by the compressed group code in the grouped instruction;

wherein each NOP number represents the number of NOP instructions to be executed by one function unit which executed one small instruction corresponding to each NOP number;

wherein said small instruction supply unit in each instruction expanding circuit includes a plurality of small instruction generating circuits provided in correspondence with respective function units of the function unit group corresponding to said each instruction expanding circuit; and wherein each small instruction generating circuit includes:

a selector circuit which generates one small instruction by combining one of the group of OP codes generated by said group code expanding circuit of each instruction expanding circuit, with respect to the compressed group code in one grouped instruction in one long instruction supplied from said long instruction supply circuit, with one of the group of operand information sets in said one grouped instruction, supplies said generated one small instruction to one function unit corresponding to said each small instruction generating circuit, and after said one small instruction is supplied, sequentially supplies NOP instructions same in number as that designated by the corresponding NOP number among the group of NOP numbers to the function unit corresponding to said each small instruction generating circuit, and a control circuit which inhibits each small instruction generating circuit to supply a small instruction to the corresponding function unit, the small instruction being supplied from said each instruction expanding circuit after the group of OP codes and containing one of a group of succeeding OP codes generated from a long instruction succeeding said one long instruction, until the NOP instructions same in number as that represented by said corresponding NOP number are supplied completely.

10. A VLIW instruction processor according to claim 9, wherein:

each instruction expanding circuit further includes a plurality of OP code queues provided in correspondence with a plurality of function units of each function unit group corresponding to said each instruction expanding circuit;

each OP code queue is connected to said group code expanding circuit and one of the plurality of small instruction generating circuits, stores a corresponding one of a plurality of OP codes each time the plurality of OP codes are output from the group code expanding circuit of each instruction expanding circuit, with respect to the group code in one grouped instruction of one compressed long instruction supplied from said long instruction supply circuit to said each instruction expanding circuit, sequentially stores a plurality of OP codes supplied from the group code expanding circuit, and sequentially outputs in the storage order the plurality of stored OP codes to said one small instruction generating circuit connected to said each OP code queue; and said control circuit of each small instruction generating circuit has a circuit for instructing one OP code queue among the plurality of OP code queues connected to said each small instruction generating circuit to output the next OP code synchronously with a completion of supplying NOP instructions same in number as that designated by said corresponding NOP number.

11. A VLIW instruction processor according to claim 10, wherein:
each instruction expanding circuit further comprises:
a group code queue connected to said long instruction supply circuit and one of the plurality of group code expanding circuits;
a group of operand queues each connected to said long instruction supply circuit and one of the plurality of small instruction generating circuits in said each instruction expanding circuit; and
a group of NOP numbers each connected to one of the plurality of small instruction generating circuits in said each instruction expanding circuit;
said group code queue stores a plurality of compressed group codes each contained in each of a plurality of instruction fields corresponding to the function unit group corresponding to each instruction expanding circuit, the plurality of compressed group codes contained in a plurality of long instructions sequentially supplied from said long instruction supply circuit, and outputting in the storage order the plurality of stored, compressed group codes to said one group code expanding circuit;
each of the group of operand queues stores a group of operand information sets to be used by a plurality of small instructions to be executed by said one function unit group corresponding to said each instruction expanding circuit, the group of operand information sets being contained in a plurality group of operand information sets contained in the plurality of instruction fields of the plurality of long instructions, and sequentially supplying the plurality of stored operand information sets to the small instruction generating circuit connected to said each operand queue;
each of the group of NOP number queues stores a group of NOP numbers to be used by a plurality of small instructions to be executed by said one function unit group corresponding to said each instruction expanding circuit, the group of NOP numbers being contained in a plurality group of NOP numbers contained in the plurality of instruction fields of the plurality of long instructions, and sequentially supplying the plurality of stored NOP numbers to the small instruction generating circuit connected to said each NOP number queue; and
said control circuit in each of the plurality of small instruction generating circuits in said instruction expanding circuit includes a circuit for instructing one operand queue among the group of operand queues connected to said each small instruction generating circuit and one NOP number queues among the group of NOP number queues connected to said each small instruction generating circuit to output the next operand and the next NOP number synchronously with a completion of supplying one or a plurality of NOP instructions by said selector circuit of said each small instruction generating circuit.

12. A VLIW instruction processor according to claim 11, wherein each instruction expanding circuit further includes a circuit connected to a plurality of control circuits in the plurality of small instruction generating circuits contained in said each instruction expanding circuit, said circuit requesting said group code expanding circuit to supply the next group code to said group code expanding circuit in response to a request issued from one of the plurality of control circuits for supplying the next operand and the next NOP number.

13. A VLIW instruction processor according to claim 11, wherein each instruction expanding circuit comprises:
a register which stores a specific group code; and
a comparator connected to said group code queue, to the plurality of operand queues, and to the plurality of NOP number queues, which compares the specific group code stored in said register with a group code contained in the instruction field of one long instruction supplied from said long instruction supply circuit,
wherein if a comparison result by said comparator indicates a coincidence of both the codes, said group code queue, the plurality of operand queues, and the plurality of NOP number queues do not receive the group code.

14. A VLIW instruction processor according to claim 9, wherein each instruction expanding circuit comprises:
a register which stores a specific group code; and
a comparator which compares the specific group code stored in said register with a group code contained in the instruction field of one long instruction supplied from said long instruction supply circuit,
wherein if a comparison result by said comparator indicates a coincidence of both the codes, reception of the group code is inhibited.

15. A long instruction expanding method for a VLIW instruction processor which executes a program composed of a plurality of long instructions obtained by compressing a plurality of small instructions to be executed in parallel by a plurality of function units, each long instruction having a plurality of grouped instructions each obtained by compressing a plurality of small instructions to be executed in parallel, for each of a plurality of function unit groups obtained by dividing the plurality of function units, the method comprising the steps of;
storing in advance a plurality of combinations of a plurality of small instructions to be executed by each of the plurality of function groups, in at least one instruction table memory;
sequentially storing long instructions composing the program in an instruction expanding unit;
deriving each grouped instruction of each long instruction;
by using the contents of each derived grouped instruction as a pointer value, reading a combination of small instructions corresponding to the grouped instruction from the instruction table memory;
generating a plurality of small instructions for each derived grouped instruction to be executed in parallel, in accordance with the read combination of small instructions and the derived grouped instruction; and
outputting the plurality of generated small instructions for each grouped instruction to a plurality of function units of the corresponding function unit group,
wherein the number of bits of each grouped instruction is smaller than the number of total bits of the small instructions which were compressed to generate the grouped instruction.

16. A method according to claim 15, further comprising the step of reading a plurality of combinations of a plurality of small instructions from a main storage connected to the VLIW processor and loading the read combinations in the instruction table memory, in accordance with the contents of the derived grouped instruction, if the derived grouped instruction is a preset load instruction.

17. A long instruction expanding method for a VLIW instruction processor which executes a program composed of a plurality of long instructions obtained by compressing a plurality of small instructions to be executed in parallel by a plurality of function units, each long instruction having a plurality of grouped instructions each obtained by compressing a plurality of small instructions to be executed in parallel, for each of a plurality of function unit groups obtained by dividing the plurality of function units, each grouped instruction having bit information representative of the number of NOP instructions to be executed continuously after a corresponding small instruction for each function unit is executed, the method comprising the steps of:

storing in advance a plurality of combinations of a plurality of small instructions to be executed by each of the plurality of function groups, in at least one instruction table memory;

sequentially storing long instructions composing the program in an instruction expanding unit;

deriving each grouped instruction of each long instruction;

by using the contents of each derived grouped instruction as a pointer value, reading a combination of small instructions corresponding to the grouped instruction from the instruction table memory;

generating a plurality of small instructions for each derived grouped instruction to be executed in parallel, in accordance with the read combination of small instructions and the derived grouped instruction;

outputting the plurality of generated small instructions for each grouped instruction to a plurality of function units of the corresponding function unit group; and outputting NOP instructions same in number as that designated by the corresponding bit information, for each grouped instruction, to a plurality of function units of the corresponding function unit group, wherein the number of bits of each grouped instruction is smaller than a sum of the number of total bits of the small instructions which were compressed to generate the grouped instruction, and the number of bits of the NOP instruction.

18. A method according to claim 17, further comprising the step of reading a plurality of combinations of a plurality of small instructions from a main storage connected to the VLIW processor and loading the read combinations in the instruction table memory, in accordance with the contents of the derived grouped instruction, if the derived grouped instruction is a preset load instruction.

* * * * *